(12) United States Patent
Castiglione et al.

(10) Patent No.: US 6,803,090 B2
(45) Date of Patent: Oct. 12, 2004

(54) FLUID TRANSPORT ASSEMBLIES WITH FLAME RETARDANT PROPERTIES

(75) Inventors: Stephanie B. Castiglione, Hudson, WI (US); Sara B. Mortenson, St. Louis Park, MN (US); Raymond P. Johnston, Lake Elmo, MN (US); James J. Kobe, Newport, MN (US); Timothy N. Narum, Lake Elmo, MN (US); Rodger J. Pereyra, Cottage Grove, MN (US); Thomas L. Tompkins, Woodbury, MN (US); Zhiming Zhou, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 106 days.

(21) Appl. No.: 10/147,104

(22) Filed: May 13, 2002

(65) Prior Publication Data

US 2003/0211291 A1 Nov. 13, 2003

(51) Int. Cl.$^7$ .............................. B32B 3/00; B27N 9/00
(52) U.S. Cl. ........................ 428/172; 428/343; 428/354; 428/920; 428/921
(58) Field of Search ................................ 428/167, 172, 428/913, 920, 921, 343, 354

(56) References Cited

U.S. PATENT DOCUMENTS

| | | | |
|---|---|---|---|
| 24,906 A | | 12/1859 | Ulrich |
| 2,576,698 A | * | 11/1951 | Russum ........................ 428/76 |
| 3,520,300 A | | 7/1970 | Flower, Jr. |
| 4,310,509 A | | 1/1982 | Berglund et al. |
| 4,323,557 A | | 4/1982 | Rosso et al. |
| 4,533,352 A | | 8/1985 | Van Beek et al. |
| 4,567,085 A | * | 1/1986 | Gey et al. .................... 428/163 |

(List continued on next page.)

FOREIGN PATENT DOCUMENTS

| | | |
|---|---|---|
| DE | 40 03 875 A | 8/1991 |
| EP | 0 275 454 A | 7/1988 |
| JP | 03 282085 | 12/1991 |
| WO | WO 99/65593 | 12/1999 |
| WO | WO 99/65595 | 12/1999 |
| WO | WO 99/65704 | 12/1999 |
| WO | WO 99/66282 | 12/1999 |
| WO | WO 01/02093 | 1/2001 |
| WO | WO 01/57152 A2 | 8/2001 |
| WO | WO/32663 A1 | 4/2002 |

OTHER PUBLICATIONS

Ser. No.: 09/495,092; Halverson et al.; Filed: Feb. 1, 2000.
Ser. No.: 09/764,478; Zhou et al; Filed: Jan. 17. 2001.
Ser. No.: 09/778,524; Johnston et al.; Filed: Feb. 7, 2001.
Ser. No.: 09/775,955; Kobe et al.; Filed: Jun. 4, 2001.
Ser. No.: 10/067,047; Kobe et al.; Filed: Feb. 4, 2002.
Ser. No.: 10/066,990; Kobe et al.; Filed Feb. 2, 2002.
Ser. No.: 10/118,120; Narum et al.; Filed Apr. 8, 2002.
3M Fluid Transport Products; FT–7000, FT–7000S; Technical Data Sheet; 2 pages.
3M Ceramic Textiles and Composites; Blankets for Aircraft Firewalls; Application Bulletin.

*Primary Examiner*—Donald J. Loney
(74) *Attorney, Agent, or Firm*—Daniel R. Pastirik

(57) ABSTRACT

The invention provides an assembly for the control and removal of fluids, the assembly comprising: A fluid control layer having a top side and a bottom side, the top side constructed to facilitate the evaporation or the flow of a fluid disposed thereon; a fire retardant material having a first major surface and a second major surface, the first major surface associated with the bottom side of the fluid control layer, the fire retardant material comprising a polymer; and an adhesive layer associated with the second major surface of the fire retardant material. A fluid management system for aircraft and a method for the use of the system in aircraft are also described.

58 Claims, 12 Drawing Sheets

U.S. PATENT DOCUMENTS

| | | |
|---|---|---|
| 4,679,590 A | 7/1987 | Hergenroeder |
| 5,349,965 A | 9/1994 | McCarver |
| 5,437,651 A | 8/1995 | Todd et al. |
| 5,514,120 A | 5/1996 | Johnston et al. |
| 5,628,735 A | 5/1997 | Skow |
| 5,648,145 A * | 7/1997 | Martin ....................... 428/161 |
| 5,728,446 A | 3/1998 | Johnston et al. |
| 5,759,659 A | 6/1998 | Sanocki et al. |
| 5,804,610 A | 9/1998 | Hamer et al. |
| 5,932,298 A | 8/1999 | Moon |
| 6,080,243 A | 6/2000 | Insley et al. |
| 6,103,152 A | 8/2000 | Gehlsen et al. |
| 6,290,685 B1 | 9/2001 | Insley et al. |
| 6,375,871 B1 | 4/2002 | Bentsen et al. |

* cited by examiner

FLUID TRANSPORT ASSEMBLIES WITH FLAME RETARDANT PROPERTIES

This invention relates to assemblies for the control of fluids in aerospace applications and the like. Assemblies, fluid management systems containing such assemblies and methods using the assemblies for the control of fluids in an aircraft are provided.

BACKGROUND OF THE INVENTION

The collection of liquid in industrial applications (e.g., spills, condensate, pooled fluids, etc.) can cause problems over a period of time. Liquid management problems lead to corrosion, power supply loss, added weight from retained liquid, loss in efficiency, insufficient energy usage, safety hazards, growth of mold and mildew and the like.

Current methods of liquid control focus on the prevention of liquid buildup on a surface through, for example, the use of absorbent materials, protective films and tapes, and sealants. Some products aid in the removal of liquid from a surface. For example, fluid transport products, such as those available from 3M Company of St. Paul Minn. ("3M"), comprise a polyolefin substrate with a low surface energy adhesive. This tape construction provides rapid fluid removal from surfaces, fluid management for corrosion reduction, and the like.

The transport of liquid across a structured surface may be characterized as "active" or "passive" based upon the mechanism that causes flow of the liquid. Where liquid transport pertains to a non-spontaneous liquid flow regime wherein liquid flows, for the most part, from an external force applied to the structured surface, the liquid transport mechanism is considered "active". On the other hand, where liquid is transported spontaneously without external force, the liquid transport mechanism is considered "passive".

Active liquid transport products have been developed based upon specific applications, including absorbent pads or a liquid pervious layer combined with liquid transport devices. For example, mat products including active liquid transport and absorbent pads or liquid pervious layers are described in U.S. Pat. Nos. 5,437,651 to Todd et al. and 5,349,965 to McCarver. In each case, channels are defined on a surface of a substrate to direct liquid flow from substantially all of the area of a liquid pervious layer. These products remove liquid while having the liquid pervious layer act as a liquid adsorbing and storing layer and/or to define a liquid receiving layer. In Todd et al., a flexible backing plate is attached to an absorbent portion and a vacuum source is applied to the backing plate. The backing plate comprises a plurality of channels for suction from the vacuum source across the surface of the absorbent portion. In McCarver, a flexible pad or suction rail having a liquid permeable top surface and a liquid impermeable bottom surface is connected to a vacuum source. The suction draws liquid down into a liquid receiving chamber as it passes through the liquid pervious layer, and draws the accumulated liquid away. The liquid receiving chamber contains separation means dividing the chamber into channels for keeping the chamber from collapsing when the chamber is placed under a negative pressure.

A fluid guide device having an open structure surface for attachment to a fluid transport source is described in U.S. Pat. No. 6,080,243 to Insley et al. This reference discloses an open structured surface that defines plural channels and a slot for permitting fluid communication between a distribution manifold and at least a plurality of the channels. A fluid transport source, such as a vacuum generator, is connected to the distribution manifold.

Examples of flexible fluid transport devices that utilize both active and passive fluid transport are described in U.S. Pat. Nos. 3,520,300 to Flower, 4,747,166 to Kuntz, and 5,628,735 to Skow. Active and passive microstructured films and tapes for liquid acquisition and transport are described in pending U.S. patent application Ser. No. 09/778524 now U.S. Pat No. 6,531,206. Examples of other channeled mats for fluid removal are shown in U.S. Pat. Nos. 4,533,352 to Van Beek et al. and 4,679,590 to Hergenroeder. Examples of passive fluid transport devices having channeled fluid transport structures are described in U.S. Pat. No. 5,514,120. This reference discloses the use of a liquid management member having a microstructure-bearing hydrophilic surface, preferably in combination with a liquid permeable top sheet, a back sheet, and an absorbent core disposed between the top and back sheets. The liquid management member promotes rapid directional spreading of liquids and is in contact with the absorbent core.

While the art has provided approaches to the transport of fluids, the art has generally failed to address the use of fluid transport products, such as tapes and the like, utilizing properties afforded by specialized backings. In particular, the art has not addressed the use of fluid transport products in applications requiring fire retardant properties, conformability of the fluid transport structure, integration into fuselage assemblies, flooring structures, and the like. The art has also failed to provide fluid transport products with specialized backings that may be firmly secured to a surface but can be removed from the surface without leaving significant adhesive or foam residue on the surface after the product has been removed. The art has also not provided assemblies that will pass more stringent flame retardancy tests related to materials that are incorporated into fuselage assemblies and insulation blankets used in the aerospace business.

It may be advantageous, for example, to provide fluid transport products for use in applications where a fire retardant feature is needed or is required by applicable regulations. For example, fluid transport tapes to be used in electric or electronic applications may be exposed to electrical current or possibly to short circuits. Moreover, heat generated from the use of the associated electronic component or electrical device may further increase the risk of fire. Consequently, industry standards or regulations can require that any such products satisfy qualifying tests such as burn or flammability tests, and the like. For electrical and electronics applications, the industry standard flammability test is Underwriters Laboratories (UL 94 "Standard for Tests for Flammability of Plastic Materials for Parts in Devices and Appliances"). For rail transit and transportation applications, the industry standard is American Society for Testing and Materials ASTM E662 ("Test Method for Specific Optical Density of Smoke Generated by Solid Materials") and ASTM E162 ("Test for Surface Flammability of Materials Using a Radiant Energy Source"). For aerospace applications, fluid transport tapes may have applicability to transport moisture away from the inner structures of an aircraft. In such applications, the testing criteria for the Federal Aviation Administration F.A.R. § 25.853 (July 1990) vertical burn test, subparagraph (a)(1)(i), relates to interior compartments occupied by crews or passengers, including interior ceiling panels, interior wall panels, partitions, galley structures, large cabinet walls, structural flooring, and materials used in the construction of stowage compartments. F.A.R. § 25.853 (July 1990) subparagraph (a)(1)(ii) relates to seat cushions, padding, decorative and nondecorative coated fabrics, leather, trays and galley furnishings, electrical conduit, thermal and acoustical insulation and insulation covering air ducting, joint and edge covering and the like. Materials used for these applications must be self-extinguishing when tested vertically in accordance with the procedures of F.A.R. § 25.853 (July 1990) (a)(1)(i) and (a)(1)(ii). In addition, another industry standard, for rail transit and aerospace applications, is Boeing Specification Support Standard, BSS 7239 ("Test Method for Toxic Gas Generation by Materials of Combustion") which requires analysis of combustion gases and has specified concentration limits on toxic gases which include HCN, $NO_X$, CO, HCl, HF, and $SO_2$.

In areas of an aircraft, moisture problems may exist, created by the combination of thermal/acoustic insulation and the large temperature swings that an aircraft flight path encounters. For example, the fuselage of an aircraft generally includes a metal outer skin supported around a metal frame comprising a stringer and circumferential members. Since temperatures within the fuselage must usually be controlled in order to insure the proper environment for occupants and cargo, most fuselage shells also include some form of thermal insulation. Insulation is generally included for acoustical reasons as well. In many aircraft this insulation takes the form of fiberglass blankets supported by the stringer and circumferential members.

The fiberglass is generally encased in a film bagging material to protect the fiberglass from condensate and other fluids. Bagging materials that have been used for such a purpose include metallized polyester, plain polyester, metallized polyvinyl fluoride, and polyimide. Although the bags are constructed to prevent moisture ingress over time, there is still a significant issue with the occurrence of wet blankets that have absorbed moisture from various sources like condensate, spills, plumbing leaks and inclement weather. Wet blankets are normally removed because, if not removed, they can contribute to corrosion and fuel inefficiencies during the operation of the aircraft. Other solutions being evaluated are structures under the blankets that promote airflow around the bag to increase drying. The specific flame retardancy requirements for areas in the fuselage are described below.

In 2000, the FAA (i.e., the United States Federal Aviation Administration) issued a notice of proposed rule making detailing new test methods for thermal/acoustic insulation intended to increase in-flight fire safety and post-crash burn-through resistance of insulation materials on aircraft. Materials must meet the FAA's new in-flight fire protection test, which is based on the American Society for Testing, and Materials test designated as ASTM E 648-97, Mar. 10, 1999. The FAA has drafted a proposed requirement that would mandate both enhanced in-flight fire resistance and post-crash burn through protection (see, e.g., Department of Transportation, Federal Aviation Administration, Improved Flammability Standards for Thermal/Acoustic Insulation Materials Used in Transport Category Airplanes; Proposed Rule, 14 CFM Part 25, et al., Federal Register, Vol. 65, No. 183, Wednesday, Sep. 20, 2000, pp. 56992–57022).

To meet the foregoing fire resistant requirements for broad use of these fluid management systems, backings for tapes and the like have been incorporated into the fluid transport films wherein the backings may be made with fire retardant agents. However, the past attempts to include an effective level of a fire retardant material in a fluid transport construction (e.g., a pressure sensitive tape) resulted in a diminished effectiveness of the fluid transport product. Consequently, fire retardant constructions have not been used to provide additional performance for fluid transport tapes in electrical or electronic applications, transportation applications, or aerospace applications. Additionally, it may also be desirable to use fluid transport products in applications where fire retardant properties may or may not be needed but where conformability and stretch release properties or the like are desirable. Products having a stretch release feature can generally be removed from a substrate in a "clean" manner in that the removal of the product does not leave a visible amount of residue on the substrate.

It is desirable to provide fluid transport tapes and the like comprising a fluid transport film associated with a substrate. It is also desirable to provide such tapes with a substrate that may incorporate fire retardant material. It is also desirable to provide fluid transport tapes comprising fluid transport films associated with a foamed substrate that provides stretch release properties so that the products may be easily removed from the surfaces to which they are adhered. It is also desirable to provide a fluid transport film integrated into a panel, insulation blanket, and flooring assembly that has active and passive fluid management properties, flame retardant properties, easy removal properties, for use as an active or passive fluid management system for aircraft, automotive, transportation vehicles and devices.

SUMMARY OF THE INVENTION

In a first aspect, the present invention provides an assembly comprising:

A fluid control layer having a top side and a bottom side, the top side constructed to facilitate the evaporation or the flow of a fluid disposed thereon;

A fire retardant material having a first major surface and a second major surface, the first major surface associated with the bottom side of the fluid control layer, the fire retardant material comprising a polymer; and An adhesive layer associated with the second major surface of the fire retardant material.

In the description of the preferred embodiment, certain terms are used in describing aspect of the invention. All such terms are intended to be interpreted in a manner consistent with their usage by those skilled in the art. For convenience, by way of example and not limitation, the following meanings are set forth:

"Fluid control film" ("FCF") or "Fluid transport film" ("FTF") refer to a film or sheet or layer having at least one major surface capable of manipulating, guiding, containing, spontaneously wicking, transporting or otherwise controlling a fluid.

"Fluid transport tape" refers to a fluid control film or a fluid transport film associated with a means for affixing the film to a substrate.

"Microreplication" refers to a microscopically structured surface made by a process where the surface features retain an individual feature fidelity during manufacture.

"Aspect ratio" is the ratio of the length of a channel to its hydraulic radius.

"Hydraulic radius" is the wettable cross-sectional area of a channel divided by the length of its wettable perimeter.

"Intumescent" or "Intumescence" refers to materials or properties of materials, specifically the foaming or swelling of a material when exposed to high surface temperatures or flames;

"Intumescent fire retardant" refers to an intumescent substance that when applied to or incorporated within a combustible material, reduces or eliminates the tendency of the material to ignite when exposed to heat or flame; and in general, when exposed to flame, the intumescent induces charring and liberates non-combustible gases to form a carbonific foam which protects the matrix, cuts off the oxygen supply, and prevents dripping. Intumescent fire retardants generally comprise an acid source, a char former, and a blowing agent.

"Fire retardant" refers to a substance that when applied to or incorporated within a combustible material, reduces or eliminates the tendency of the material to ignite when exposed to heat or flame; and "Stretch release" refers to the property of an adhesive article characterized in that, when the article is pulled and elongated from a substrate surface at a rate of 30 centimeters/minute and at an angle of 45° or less, the article detaches from a substrate surface without leaving a significant amount of visible residue on the substrate.

"Cleanly removable" refers to the property of an adhesive article characterized in that, when the article is pulled from a surface at a rate of no greater than 30 centimeters/minute, the article detaches from the surface of the substrate without leaving significant visible residue, excluding discoloration, on the surface.

"Insulation Blanket" refers to insulating material that provides thermal and acoustical insulation.

In another aspect, the invention provides a fluid management system comprising a layer of insulating material associated with the foregoing assembly.

In still another aspect, the invention provides a fluid management system for aircraft having an outer fuselage surface forming the exterior surface of the aircraft, an inner fuselage surface forming the outermost interior surface of the aircraft, the system comprising the foregoing assembly associated with the inner fuselage surface.

In another aspect, the invention provides a fluid management system for aircraft having an outer fuselage surface forming the exterior surface of the aircraft, an inner fuselage surface forming the outermost interior surface of the aircraft, and an inner compartment housed within the inner surface, the inner compartment having a compartment outer surface adjacent to the inner fuselage surface, the compartment outer surface comprising the foregoing assembly.

In still another aspect, the invention provides a method for the management of fluid within an aircraft having an outer fuselage surface forming the exterior surface of the aircraft, an inner fuselage surface forming the outermost interior surface of the aircraft, and an inner compartment housed within the inner surface, the inner compartment having a compartment outer surface adjacent to the inner fuselage surface, the method comprising: placing the foregoing assembly between the compartment outer surface and the inner fuselage surface to facilitate the evaporation or the flow of fluid. In this aspect of the invention, the assembly may be affixed or otherwise associated with the inner fuselage surface or with the compartment outer surface.

Further details of the preferred embodiment of the invention will be apparent to those skilled in the art upon consideration of the remainder of the disclosure, including the Detailed Description of the Preferred Embodiment, in conjunction with the various drawings, and the appended claims.

BRIEF DESCRIPTION OF THE DRAWINGS

In describing the embodiments of the invention, reference is made to the various Figures, wherein the structural features are identified with reference numerals where like numerals indicate like structures, and in which.

DETAILED DESCRIPTION OF THE PREFERRED EMBODIMENT

Figure 1A:
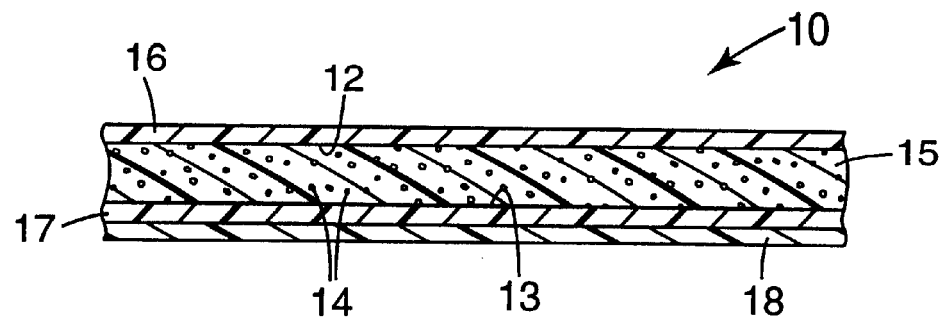
FIG. 1a is an enlarged view, in cross section, of a flame-retardant backing for use in the invention.

The present invention relates to articles with specialized backings, such as tapes that incorporate a fluid control film component. Specialized backings represented by the current invention are generally characterized as fire retardant. As described, the fluid control tapes of the invention may be used in any of a variety of applications where the transport of fluid or moisture is needed and/or desired. Suitable fluid control films for use in the present invention are described, for example, in U.S. Ser. Nos. 08/905,481; 09/099,269; 09/106,506; 09/100,163; 09/099,632; 09/099,555; and 09/099,562; and U.S. Pat. Nos. 5,514,120; 5,728,446; 6,080,243; and in co-pending U.S. patent application Ser. No. 09/778,524 ("Microstructured Surface Film Assembly For Liquid Acquisition And Transport"). The tapes of the invention include "active" systems and "passive" systems suitable for use in any of a variety of applications including aerospace applications in which the fluid transport tape may be used for the control of moisture within, for example, the passenger compartments of aircraft and/or in the areas outside of the passenger compartment along the inner surfaces of the fuselage or elsewhere in the interstitial areas between the fuselage and the insulation material that surrounds the passenger compartment. Specific embodiments of the invention are set forth below.

The fluid control films used herein are generally in the form of a sheet or film. The film or sheet is thin, flexible, cost effective to produce, and it can be tailored to possess desired material properties for its intended application. In one embodiment, the fluid control film has a flame retardant foam backing affixed to the fluid control film with an attachment means (such as adhesive) provided on one or both major surfaces of the foam to bond a surface of the foam backing to the fluid control film and to permit ready application of the other surface of the foam backing to a variety of surfaces in use. In other embodiments the fluid control films may utilize a non-foam flame retardant backing. Various constructions for embodiments of the invention are described below with reference to the drawings in which individual features are identified by reference numerals.

Referring now to the drawings, one example of a fire-retardant foam backing according to the invention is shown in FIG. 1a. The backing 10 is provided as a sheet of material having a first flat major surface 12 and a second major surface 13 opposite the first surface 12. In this embodiment, at least one fire retardant substance is interspersed throughout a foam matrix layer 15. Suitable fire retardant materials are further described herein and include any of a variety of such substances, typically materials that are non-halogenated and antimony-free. The polymer foam matrix 15 further comprises a plurality of expanded cells 14 interspersed within the matrix. The expanded cells 14 are the result of the foaming process for the manufacture of the foam matrix 15 and may be created through the use, for example, of chemical blowing agents or by the inclusion of expandable polymeric or glass microspheres or combinations thereof.

The backing 10 further includes skin adhesive layers 16 and 17 provided on opposing surfaces of the polymer foam matrix 15. A first skin adhesive layer 16 is provided on the first major surface 12 of the foam matrix 15 and a second skin adhesive layer 17 is provided on the second major surface 13 of the foam matrix 15. The compositions of the first and second skin adhesives 16 and 17 may be the same or different and may comprise any of a variety of adhesive materials as are further described herein. A release liner 18 is optionally included to protect the second skin adhesive layer 17 prior to the application of the adhesive layer 17 to a substrate.

Figure 1B:
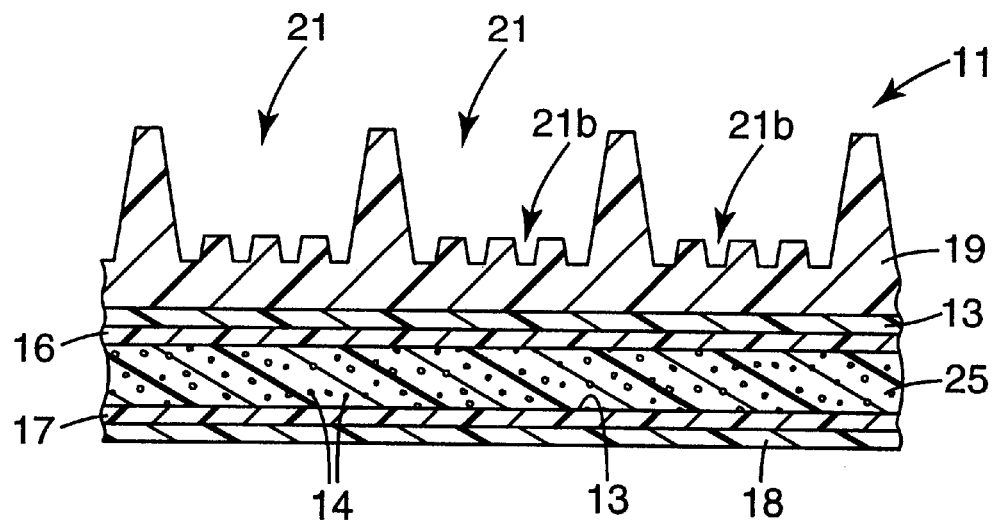
FIG. 1b is an enlarged view, in cross section, of one embodiment of the present invention.

Referring to FIG. 1b, a fluid transport tape 11 is shown having a fluid transport film 19 affixed to a flame-retardant layer 25 by first skin adhesive 16. It will be appreciated that the first skin adhesive 16 may consist of a primer layer and is compatible with the material used in the manufacture of the fluid transport film 19 so that a secure adhesive bond is obtained between the flame-retardant layer 25 and the fluid transport film 19. A tie layer 13 is depicted as an optional layer to promote a secure adhesive bond between the flame-retardant layer 25 and the fluid transport film 19. The second skin adhesive layer 17 is chosen to provide a suitably strong adhesive bond between the flame-retardant fluid transport tape 11 and a substrate to which the tape will be adhered. Flame retardant layer 25 typically comprises a polymer foam matrix with a flame retardant material interspersed within the matrix. Alternatively, other flame retardant materials may be used in the flame retardant layer. Such other materials may include ceramic materials, metallic materials, intumescents, for example.

The fluid transport film 19 includes primary channels 21 to facilitate the transport of liquid along the length of the film 19. The channels 21 of the fluid control films of the present invention can be made to comprise any of a variety of profiles or geometries so long as the channels can provides desired liquid transport. Each of the primary channels 21 comprise a plurality of secondary channels 21b. It will be appreciated that the channels 21 may be configured without secondary channels therein, and the actual shape and construction of the channels, their lengths, the manner in which they are isolated from one another or the manner in which fluid is able to flow from one channel into an adjacent channel are to be considered within the scope of the present invention. In some embodiments, the fluid transport film will have primary channels on only one major surface as shown in FIGS. 2a–2i. In other embodiments, however, the fluid transport film will have primary channels on both major surfaces, as shown in FIGS. 2j and 2k. Further details of the channel structures are discussed below.

Figure 2A:
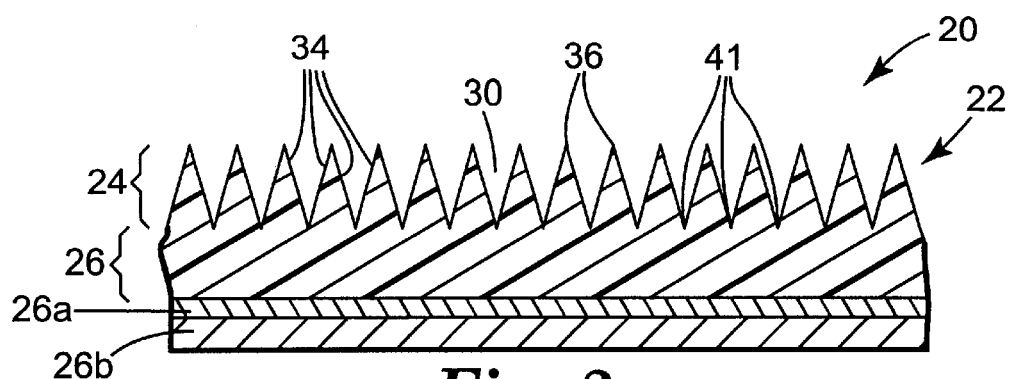
FIGS. 2a through 2k are cross-sectional cutaway views of illustrative embodiments of fluid control films of the present invention.

As shown in FIG. 2a, a fluid transport tape 20 includes a fluid transport film or layer 22 comprising polymeric material. The film 22 has a structured surface 24 comprising one of the two major surfaces of the film 22. The film 22 includes a body layer 26 supporting a structured surface 24 projects. Channels 30 are provided within the layer 22 by a series of inverted v-shaped sidewalls 34 which extend above the body layer 26 and, in profile, appear as a series of regularly spaced peaks 36. Each peak 36 defines a ridge running along each channel. The peaks 36 may be formed as continuous structures in that they extend along the entire length of the structured surface 24 without interruption. Otherwise, the peaks may extend along the length of the structured surface 24 as discontinuous elements (e.g., pins, bars, etc.) which still functionally serve to define the channels therebetween. A cap layer (not shown) may be provided over the structured surface 24 to aid in channel definition. In some cases, the sidewalls 34 and peaks 36 may extend entirely from one edge of the layer 22 to another without alteration. However, in some applications it may be desirable to shorten the sidewalls 34 and thus extend the peaks 36 only along a portion of the structured surface 24. That is, channels 30 that are defined between peaks 36 may extend entirely from one edge to another edge of the layer 22, or such channels 30 may only be defined to extend over a portion of the layer 22. Channels 30 that extend only over a portion may begin at an edge of the layer 22, or they may begin and end intermediately within the structured surface 24 of the layer 22. The channels 30 are defined in a predetermined, preferably ordered arrangement over a continuous surface of polymeric material.

Figure 2B:
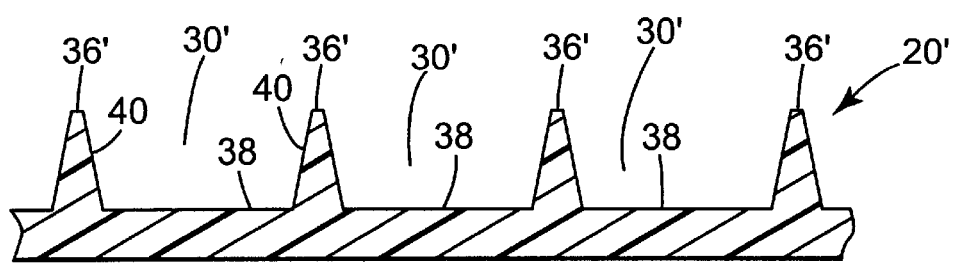
Figure 2C:
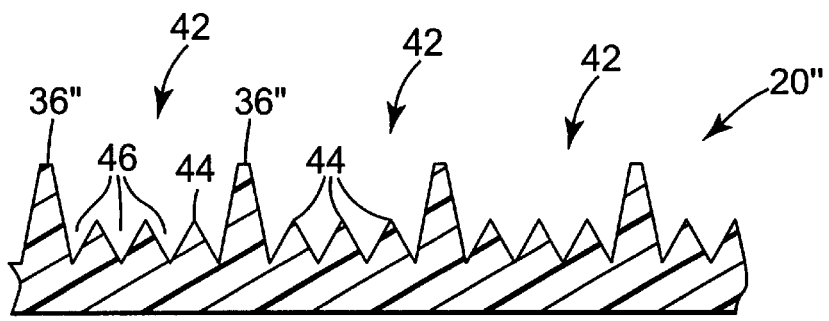
Figure 2D:
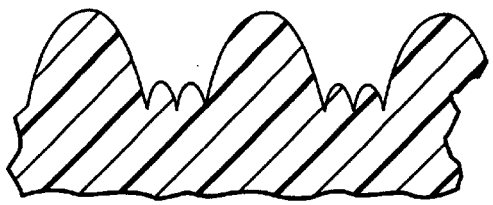
Figure 2E:
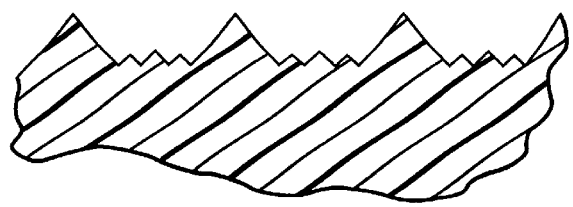
Figure 2F:
Figure 2G:
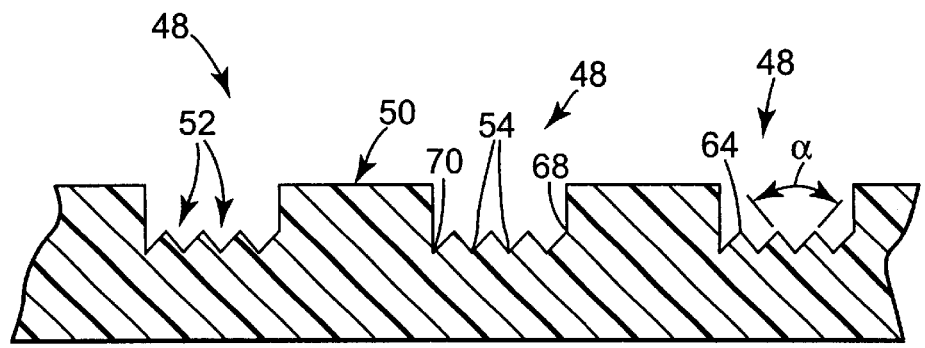
Figure 2H:
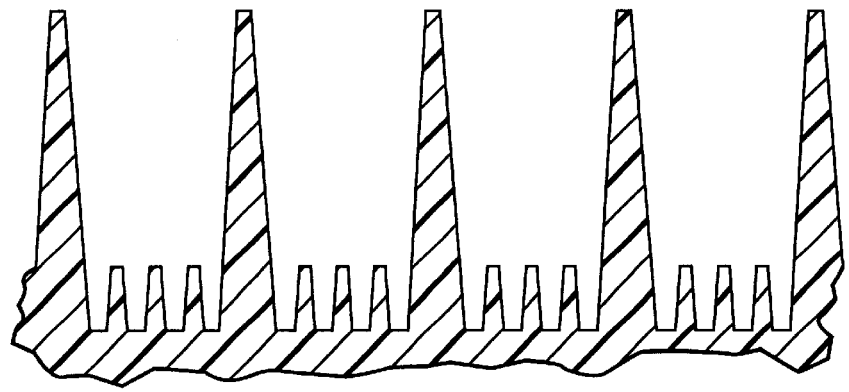

Other channel configurations are contemplated, such as that shown in FIG. 2b. Fluid control film 20' has channels 30' which have a wider flat valley between slightly flattened peaks 36'. Like the FIG. 2a embodiment, a cap layer (not shown) can be secured along one or more of the peaks 36' to define discrete channels 30'. In this case, bottom surfaces 38 extend between channel sidewalls 40, whereas in the FIG. 2a embodiment, sidewalls 34 connect together along lines 41.

FIGS. 2c–2k illustrate other embodiments of fluid control films suitable for the present invention. Although FIGS. 2a–2k illustrate elongated, linearly-configured channels, the channels may be provided in other configurations. For example, the channels could have varying cross-sectional widths along the channel length—that is, the channels could diverge and/or converge along the length of the channel. The channel sidewalls could also be contoured rather than being straight in the direction of extension of the channel, or in the channel height. Generally, any channel configuration that can provide discrete channel portions that extend from a first end of the channel to a second end of the channel within the fluid transport device are contemplated. The channels may be configured to remain discrete along their whole length if desired. The channels and the fluid transport assemblies of the invention are constructed so that liquid can travel along the channel, and, in some embodiments, the channels are constructed to facilitate the flow of liquids from the second channel ends to the first channel ends.

Figure 2I:
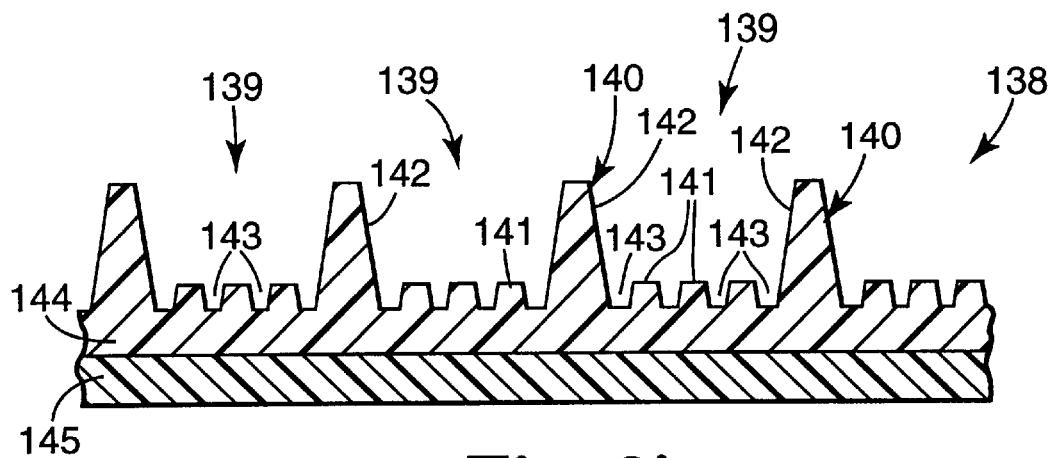
Figure 2J:
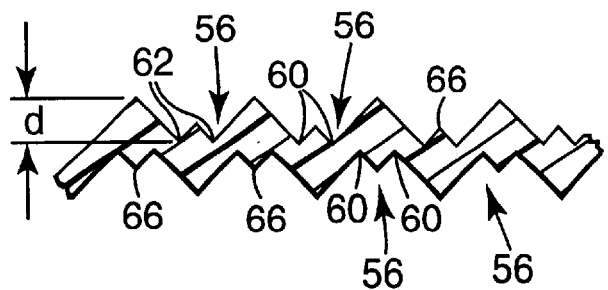
Figure 2K:
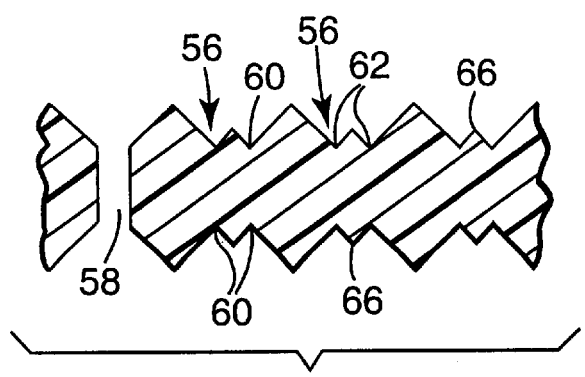

Another embodiment of a fluid transport film is illustrated in FIG. 2i as fluid control film 138. The film 138 has wide primary channels 139 defined between peaks 140. A plurality of smaller or minor peaks 141 are located between side walls 142 of the peaks 140. The smaller peaks 141 thus define secondary channels 143 therebetween. The smaller peaks 141 are not as high as the peaks 140 and, as illustrated, create a first wide primary channel 139 including smaller secondary channels 143 distributed therein. The configuration of the primary channels 139 and the secondary channels 143 of FIG. 2i, is generally the same as the configuration of the primary channels 21 and secondary channels 21b of FIG. 1b. In one particular embodiment, the center-to-center distance between major peaks 140 may be about 9 mils, and the center-to-center distance between minor peaks 141 may be about 1.9 mils. Also, the center-to-center distance between adjacent major and minor peaks 140 and 141 may be about 2.6 mils. The walls of the peaks taper at an about 11E taper. Each peak is plateaued at its upper top with a lateral width that may be about 1 mil. At its base, the major peak 140 can have a width of about 2.5 mils., and at its base, the smaller peak 141 can have a width of about 1.3 mils. The height of the peaks 140 can be about 7.8 mils., while the height of the peaks 141 can be about 1.6 mils. It will be appreciated that the foregoing dimensions are included herein for descriptive purposes only, and the invention is not to be construed as limited in any way to the specific dimensions described herein for the individual features of the invention.

Figure 3A:
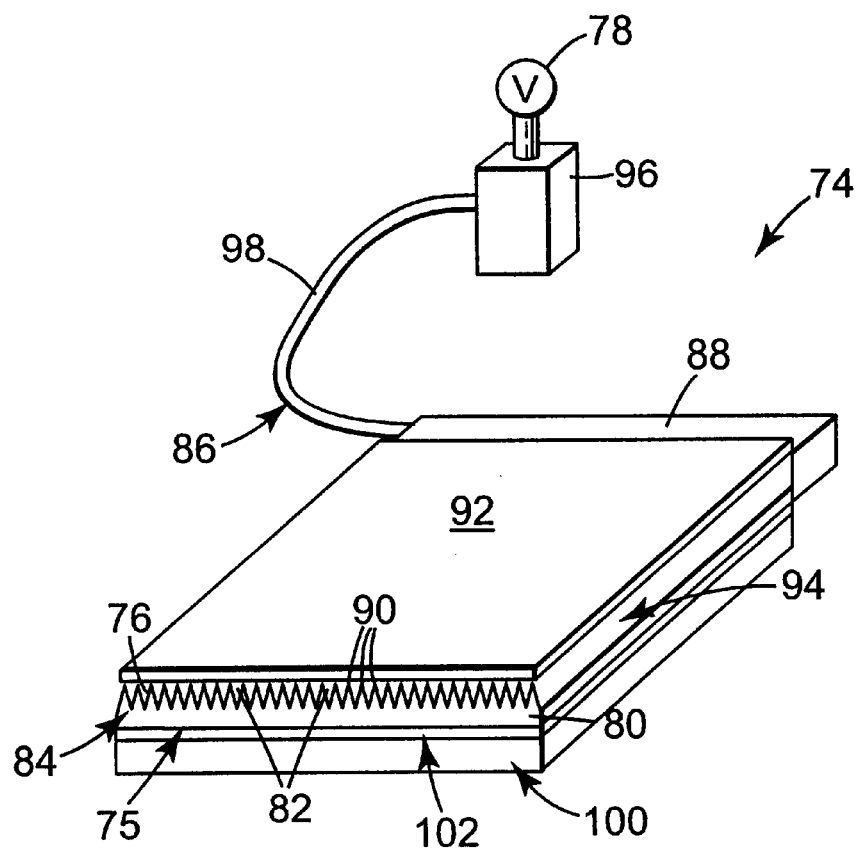
FIG. 3a is a perspective view of an active fluid transport device in accordance with the present invention.

A body layer or backing layer 144 supports the peaks 140 and 141 and is typically made of the same material as the peaks Referring now to FIG. 3a, an active fluid transport device 74 is illustrated which includes a layer 75 of polymeric material that has a microstructured surface 76 on one of its two major surfaces. The device 74 also includes a potential source 78 for providing a potential to assist in moving a liquid over the microstructured surface 76 of the active fluid transport device 74. Layer 75 also includes a body layer 80 from which the structured surface 76 projects. Body layer 80 serves to support microstructured surface 76 to retain the individual structured features together in layer 75, and may include additives or additional layers as described herein. Layer 75 may be comprised of flexible, semi-rigid, or rigid material, which may be chosen depending on the particular application of the active fluid transport device 74. The layer 75 will typically comprise a polymeric material to create a microstructured surface 76.

Each of the channels 82 is opened at one edge of the layer 75 to define channel inlets 84. Liquid can thus pass through the inlets 84, at the second channel ends, guided by the channels 82 toward a further edge of the layer 75 to a connector 86 disposed at the first channel ends. The connector 86 is positioned to be in fluid communication at the first ends of the channels 82 (not shown) and also is in liquid communication with the potential source 78. The connector 86 may be fashioned in a variety of forms but as illustrated in FIG. 3a, it includes a manifold 88. The manifold 88 is provided with an internal plenum (not shown). The plenum is in fluid communication with the first ends of the channels 82. The plenum may simply comprise a chamber within the manifold 88 that is sealingly connected to at least a plurality of the first ends of the channels 82. The manifold 88 may be flexible, semi-rigid, or rigid, like the layer 75. A second manifold (not shown) also may be provided at the side of layer 75 having inlets 84 so as to supply liquid to the channels 82, depending on the particular application. The manifolds may be formed using microreplicated channels (e.g., converging channels).

The connector 86 may be of any construction that enables the potential to be transferred from the source 78 to the multiple channels 82. Although a manifold with a plenum and a tubing have been described, other constructions for the connector 86 are contemplated such as compression couplings, or seals and gaskets that fluidically join a conduit to the flow channels and permit the isolation or partition of regions of higher and lower potential from the surrounding environment. The connector 86 could also comprise capillary fibers, for example, less than 10 µm in inner diameter, each in fluid communication with an individual channel to allow individual liquids to flow discretely through separate channels. The connector could also be one or more molded chambers, a microstructured fluid conduit integrally or non-integrally disposed relative to the discrete flow channels, or for example, a system or mechanism that allows the discrete microstructured flow channels to be seated in a centrifuge or that allows a flow stream such as a jet to be directed at channel inlets or outlets.

To close off or enclose at least some of the channels 82 along peaks 90 thereof, a cap layer 92 may be fitted or otherwise placed against the structured surface 76 so that the cap layer 92 isolates individual channels 82 to create discrete liquid flow channels. In some embodiments, the capillary module 94 can have a thickness within the range from about 1 mm to about 10 mm, and more typically from about 2 mm to about 6 mm. Cap layer 92 may likewise sealingly connect to the manifold 88 so that plural discrete channels 82 provide active liquid transport channels based upon the creation of a potential difference along the channels 82 from a first potential to a second potential. The cap layer 92 may be bonded to the peaks 90 of some or all of the structured surface 76 to enhance creation of discrete channels 82. The formation of discrete channels 82 may be accomplished through thermal bonding, ultrasonic welding, compression, or mechanical engagement such as with an interference fit. Bonds to the cap layer 92 may be provided along the entire continuous length of the peaks 90, or the bonds may be discretely placed by spot welding, for example. Additionally, bonding between the cap and the peaks may be in an ordered or random pattern. Finally, the cap layer 92 may simply be placed over the structured surface 76, without an adhesive or bond therebetween.

The cap layer 92 may consist of a protective film, a flooring laminate, the surface of another device, or any other material or surface that serves to cover the working surface of the fluid transport film. Cap layer 92 may typically have thickness within the range from about 0.01 mm to about 2 mm. The cap layer may be made from a polymeric material such as the polymers described herein for the structured polymeric layer. Optionally, cap layer 92 may be a material such as a spunlaced, spunbond, blown microfiber or carded nonwoven. Polymers may be chosen such that the cap layer 92 can be secured to the structured surface 76. Attachment of the cap layer can be accomplished by thermal bonding, for example, or by using conventional adhesives that are compatible with the cap layer material 92 and the polymeric structured layer 75. When an adhesive is used for bonding of the cap layer, the adhesive is selected so that it does not flow into and possibly block the channels 82. A polymer may be chosen for the cap layer so that the cap layer can be thermally bonded to the structured surface by applying heat, for example, as from an ultrasonic welding operation. In some applications, the cap layer may be formed from more than one layer (e.g., an initial nonwoven layer covered by a linoleum layer). In such an embodiment, the nonwoven layer may act as a debris filter above the structured surface, and may also serve to increase the effective surface presented for laying down or adhering the linoleum layer.

The potential source 78 may be any means capable of establishing a potential difference along a plurality of the flow channels 82 to encourage liquid movement from a first location to a second location. As shown in FIG. 3a, the potential source 78 may be a vacuum generator (V) that may be connected to an optional collector receptacle 96. The collector receptacle 96 is connected to a manifold 88 by way of a flexible tube 98. Thus, liquid can be drawn from outside the capillary module 94 into the inlets 84, through channels 82, through the manifold 88, through the tubing 98, and into the collection receptacle 96. The receptacle 96 may advantageously be operable to empty its contents or may be otherwise connected to conventional drainage systems. When the potential source 78 is a vacuum generator (V), the vacuum provided to the channels 82 via manifold 88 may be sufficient to adequately seal the cap layer 92 to the peaks 90 in that the vacuum itself will assist in holding the cap layer 92 against peaks 90. Each of the channels 82 defined by the structured surface 76 may be isolated from one another by the attachment of the cap layer 92 against the peaks 90 so as to define discrete channels 82. In this embodiment, liquid crossover between channels 82 may be minimized, and the potential provided from an external source can be more effectively and efficiently distributed over the structured surface 76 of layer 75. It will be appreciated that one or more detachable or affixed manifolds as well as multiple potential sources may be employed depending on the particular adaptation or application. Pressure differential is an efficient liquid flow motivation method or potential that may be used to drive flow across a microstructure-bearing surface. Pressure differential can be established readily through use of a pumping system and applied either in the form of positive or negative pressure.

Other types of potential sources other than the vacuum generator (V) 78 may be used in the present invention. In fact, any means capable of causing or encouraging liquid to flow through the channels 82 is contemplated as within the scope of the invention. The potential source is normally provided as an optional and separate component of the fluid transport tape that is compatable with the fluid control film but is not always required or desired. Examples of other potential sources include but are not limited to, vacuum pumps, vacuum aspirators, pressure pumps and pressure systems such as a fan, magneto hydrodynamic drives, magnetic systems, acoustic flow systems, centrifugal spinning, hydrostatic heads, gravity, absorbents, and any other known or later developed fluid drive system utilizing the creation of a potential difference that causes or encourages liquid flow to at least some degree. Additionally, any applied field force that acts directly on the liquid such as a centrifugal force or magnetic field that causes liquid to move within the channels of the invention may be considered a liquid motive potential. In addition, the potential source may operate to move liquid onto the structured surface rather than remove liquid off of or away from the structured surface. Liquid may also be caused to flow through channels by the action of a siphon where atmospheric pressure creates the potential to move liquid in the channels. In an application of the present invention in an aircraft, the pressurization of the aircraft may be employed to achieve the pressure differential required to define a potential for liquid flow.

Figure 3B:
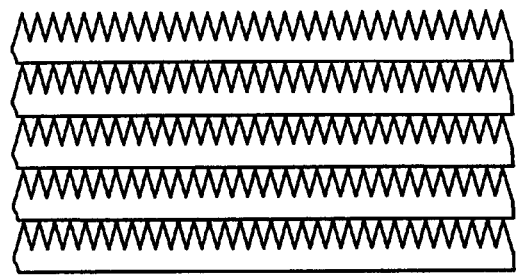
FIG. 3b illustrates, in partial sectional view, a stacked arrangement of structured layers made according to the present invention.

Although the liquid transport device shown in FIG. 3a has a structured surface 76 comprising a plurality of inverted V-shaped peaks 90 (e.g., similar to peaks 36 shown in FIG. 2a), other topography configurations for the structured surface 76 are contemplated. In addition, in some embodiments, two or more structured surfaces may be overlaid to increase flow capacity such as that shown in FIG. 3b, for example. The inclusion of two or more structured surfaces may be desired to increase the possible configurations for relative channel orientation among, for example, stacked layers of structured surfaces, as well as the possible arrangements for application of a potential to one or more of the layers. The stacked layers may comprise different channel configurations and/or numbers of channels, depending on a particular application. Furthermore, this type of stacked construction can be particularly suitable for applications that are restricted in width and therefore require a relatively narrow fluid transport device from which a certain fluid transfer capacity is desired. Thus, a narrow device can be made having increased flow capacity.

As seen in FIG. 3a, the layer 75 is mounted to a major surface of a substrate 100 (e.g., a foam backing as described herein) by suitable adhesive means 102 therebetween. The adhesive means 102 may be a continuous or discontinuous layer of pressure sensitive adhesive, or another fastening arrangement such as opposed two part mechanical fasteners, other adhesive compositions or tapes, hook and loop fasteners, opposed fields (e.g., electrical or magnetic) and the like. Adhesive means 102, when provided as a pressure sensitive adhesive, may comprise a microstructured surface.

Figure 4:
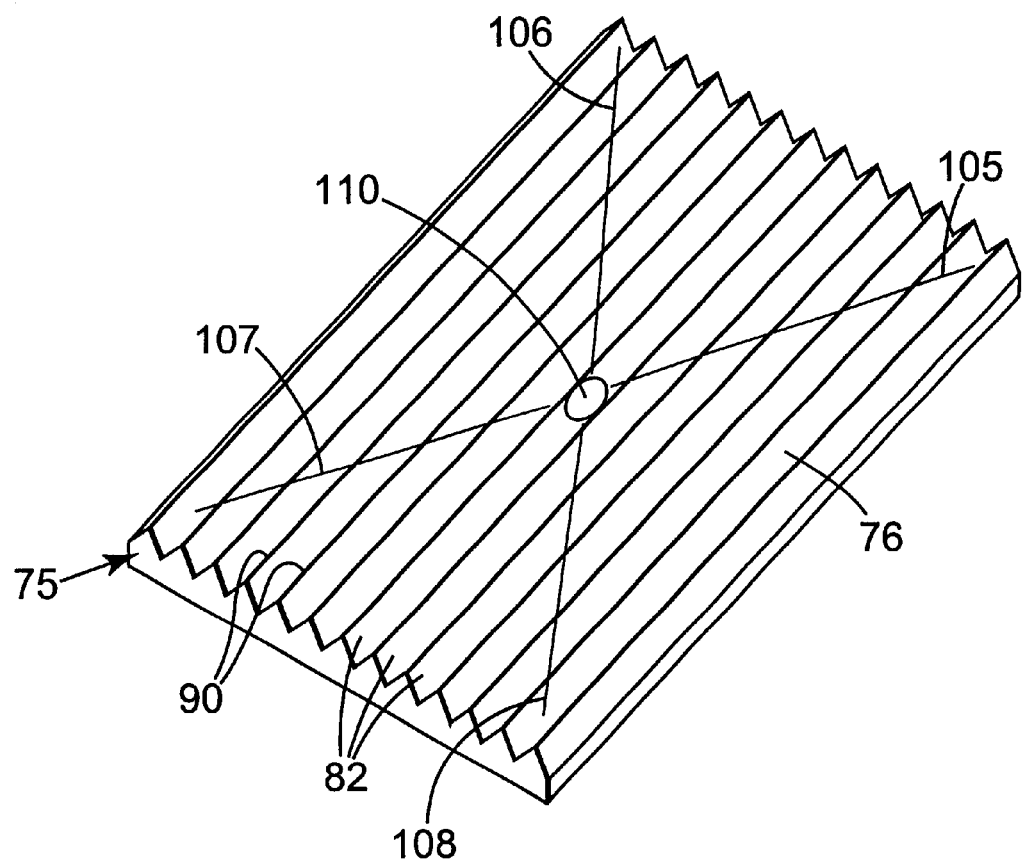
FIG. 4 is a perspective view of an alternative active fluid transport device in accordance with the present invention.

FIG. 4 illustrates another embodiment of a fluid transport or control film having a layer 75 with a structured surface 76 forming the major surface of a first side of the layer 75. The structured surface 76 includes a plurality of parallel linear channels 82. One or more cross-channels are provided in the structured surface 76, such as cross-channels 105, 106, 107 and 108. The cross-channels may be added to the structured surface 76 after its initial formation (e.g., after the structured surface 76 has been molded into the layer 75 of polymeric material) by removing portions of the peaks 90 between adjacent channels 82. Such portions may be removed by cutting or by the application of heat and/or pressure, or by overlaying a strip of material capable of transporting liquid therethrough on top of the structured surface 76.

A post embossing method (after the microstructured layer 75 has been applied to the substrate) also allows for liquid communication along the channels on the face of the fluid transport device 75. The structured surface 76 may be embossed with a hot wire, for example, to define each cross-channel in order to provide a means for liquid communication between the channels 82 to existing or newly defined liquid outlets in application. Such a liquid outlet may include a central liquid removal aperture 110 (FIG. 4) or, in the case where the cross-channels do not intersect, a separate liquid removal aperture for each cross-channel. The liquid removal aperture 110 extends through the layer 75 and through any additional layers attached thereto.

Figure 5:
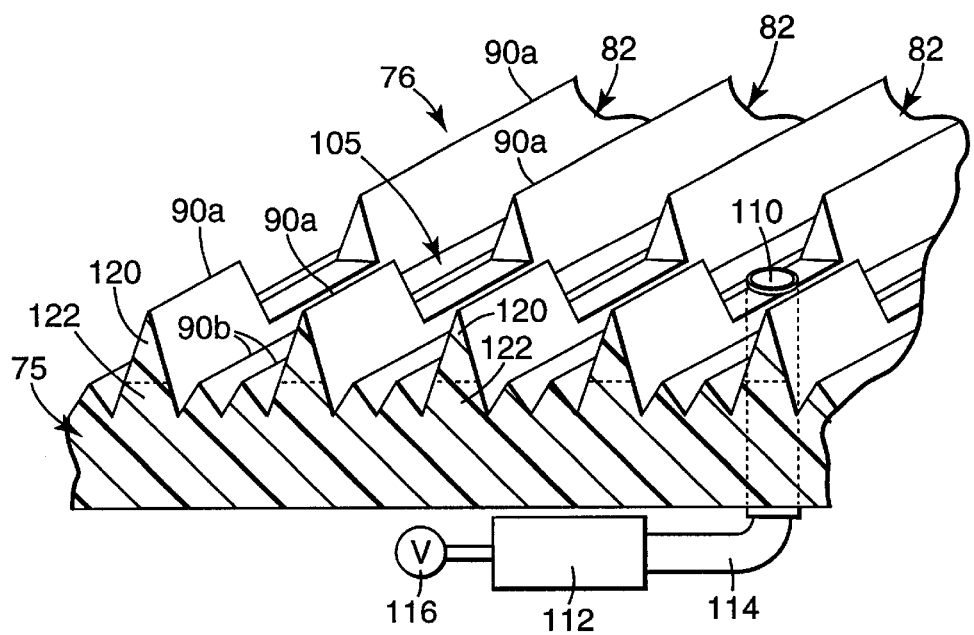
FIG. 5 is an enlarged sectional view of a portion of the active fluid transport device of FIG. 4.

As illustrated in FIG. 5, the liquid removal aperture may be fluidly coupled through a suitable conduit 114 to a liquid reservoir 112. The system may include a potential source 116 for moving liquid over the structured surface 76 through channels 82, cross-channels 105, 106, 107 or 108 (see, e.g., FIGS. 4 and 5) aperture 110, conduit 114 and ultimately to the reservoir 112. The reservoir 112 may simply be a collector site or sump, and the source 116 may be as previously described. In applications where more than one of the apertures 110 are provided (e.g., one aperture for each cross-channel), a conduit 114 may likewise be provided with each conduit connecting one or more of the apertures 110 to the reservoir 112 (or to separate reservoirs).

Figure 6A:
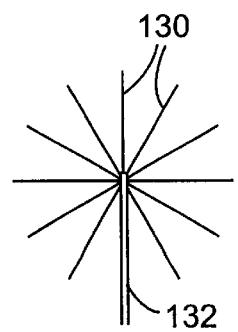
FIGS. 6a and 6b are plan views of structured layers used in an active fluid transport device in accordance with the present invention.
Figure 6B:
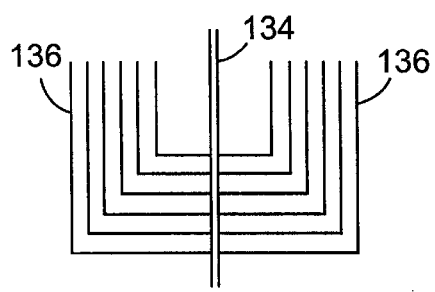

FIGS. 6a and 6b schematically illustrate channel configurations for possible use in the articles of the invention. FIG. 6a illustrates multiple discrete non-parallel converging channels 130 that may be included in the structured surface of the inventive articles to provide for intermediate fluid collection. The converging channels 130 connect to a single discrete channel 132 which may, in turn, be connected to an outlet port or liquid removal aperture (not shown). FIG. 6b illustrates a plurality of channel branches 136 connected to a central channel 134. The present invention is not to be limited to one or more specific channel configurations and any channel pattern is contemplated as within the scope of the invention as long as a plurality of discrete channels are provided over a portion of a structured surface capable of moving a fluid from a first point to a second point. Like the above embodiments, the patterned channels shown in FIGS. 6a and 6b may be covered with a cap layer (not shown) that further defines discrete flow channels that can accommodate an applied potential independently of other such channels.

Microstructured surfaces may be used to define discrete flow channels wherein each flow channel has an aspect ratio (length/hydraulic radius) which, in some embodiments may be about 1:1 or greater, in some embodiments exceeding approximately 100:1, and in other embodiments at least about 1000:1. The aspect ratio could generally will be less than about 1,000,000:1. The hydraulic radius of a channel may be, for example about 300 micrometers or less. In many embodiments, the hydraulic radius may be less than 100 micrometers, and in other embodiments less than 10 micrometers and greater than 1 micrometer. Although the hydraulic radius could be on the submicron scale, it typically will not be less than 1 micrometers for most embodiments.

The structured surface of the fluid transport tapes of the invention can be provided with a very low profile. Thus, active fluid transport devices are contemplated where the structured polymeric layer has a thickness of less than 5000 micrometers, and possibly less than 1500 micrometers. In this embodiment, the channels along the structured surface may be defined by peaks that have a height within the range from of approximately 5 to approximately 1200 micrometers and that have a peak to peak distance within the range from about 10 to about 2000 micrometers.

Suitable liquid channels for use in the present invention may be of any suitable geometry. Embodiments that include rectangular shaped channels typically will have depths within the range from about 50 to about 3000 microns with widths within the range from about 50 to about 3000 microns. Channels presented in a "V" shape will also have the foregoing dimensions with an included angle of generally between about 20 to about 120 degrees and most commonly about 45 degrees. One useful channel structure has a nested construction wherein the master channels are 200 microns deep and repeat every 225 microns with three equally spaced channels in the base, each 40 microns deep. Compound channels are also possible such as rectangular shaped primary or major channels that contain smaller or minor rectangular and/or "V" channels therewithin.

One area of application for the fluid transport films and tapes of the invention is in the aerospace industry. In particular, the tapes of the invention are well suited for use within an aircraft such as a commercial air-carrier, for example. The tapes may be used, for example, in the galley-lavoratory compartment of an aircraft for control of liquids coming from spills, inclement weather and plumbing leaks. Additionally the tapes may be used to control fluid in the interstitial areas between the fuselage outer skin and the inner passenger compartment. Condensation is the primary source of fluid accumulation in this interstitial area. In this particular application, the tapes of the invention can be used in both the passive and the active modes and can be installed to perform in various orientations, such as vertically, horizontally, diagonally or combinations thereof.

Figure 7:
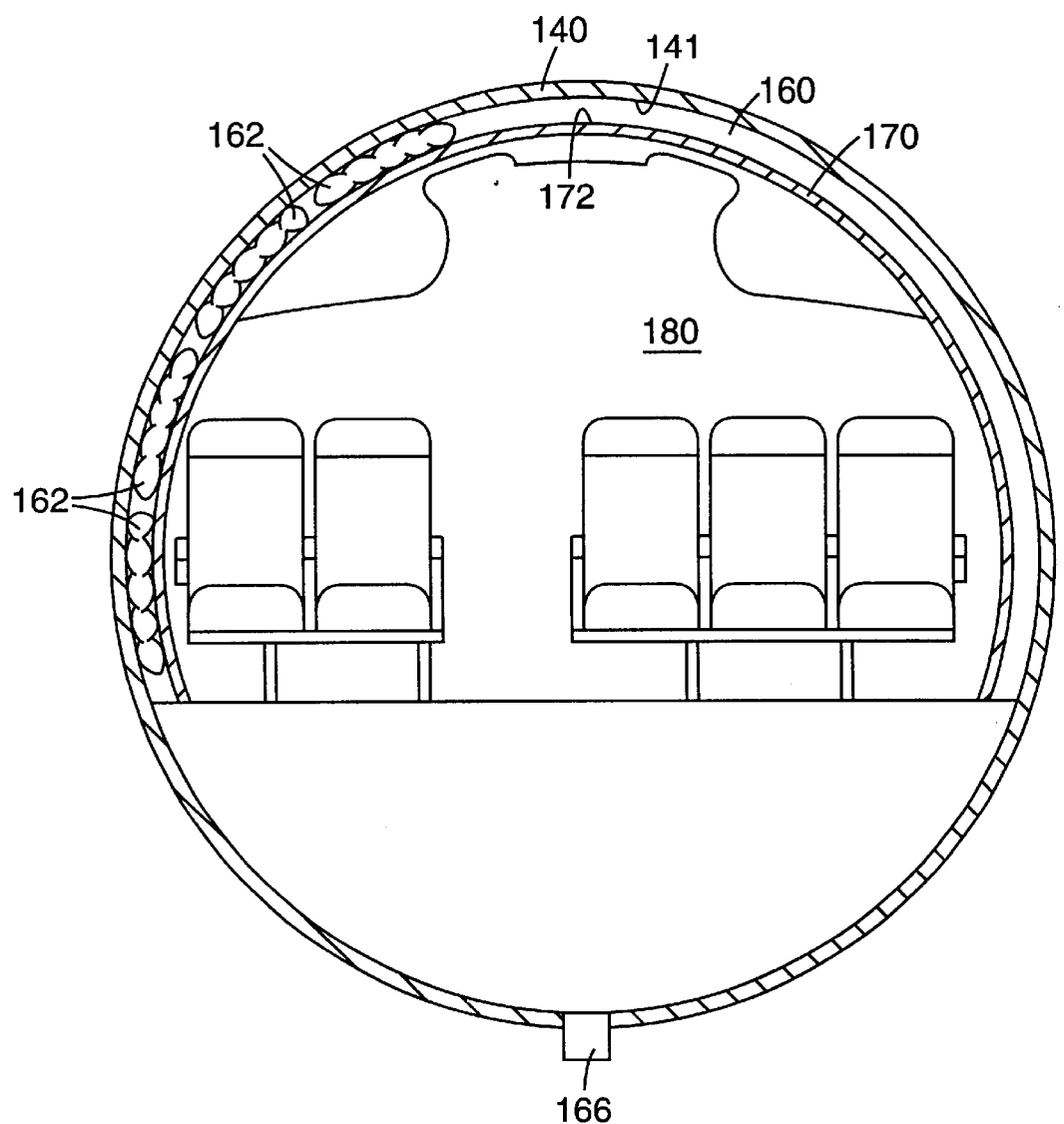
FIG. 7 is a cross section, of an aircraft fuselage, illustrating the prior art insulation in the interstitial space.

FIG. 7 shows, in cross section, an aircraft fuselage having an outer skin wall 140 and an interior surface 141 of the outer skin wall 140. An interstitial space 160 separates the outer skin wall 140 from an interior wall 170 surrounding the inner compartment 180 of the aircraft. Outer surface 172 of the interior wall 170 is exposed to the interstitial space 160. Thermal and accoustic insulation for the aerospace industry may comprise custom made blankets 162 disposed within the interstitial space 160. The fire retardant fluid transport tapes of the invention may be applied to any of the various surfaces or combinations of surfaces within the interstitial space 160 to address the problem of fluid ingress that is known to occur. By inclusion of the transport tapes of the invention within the interstitial space 160, unwanted moisture may be transported from the interstitial space 160, away from the uppermost (crown) area of the fuselage to a drain valve 166 located on the bottommost (bilge) portion of the aircraft. Drain valve 166 allows the moisture to be expelled from the aircraft.

Figure 8A:
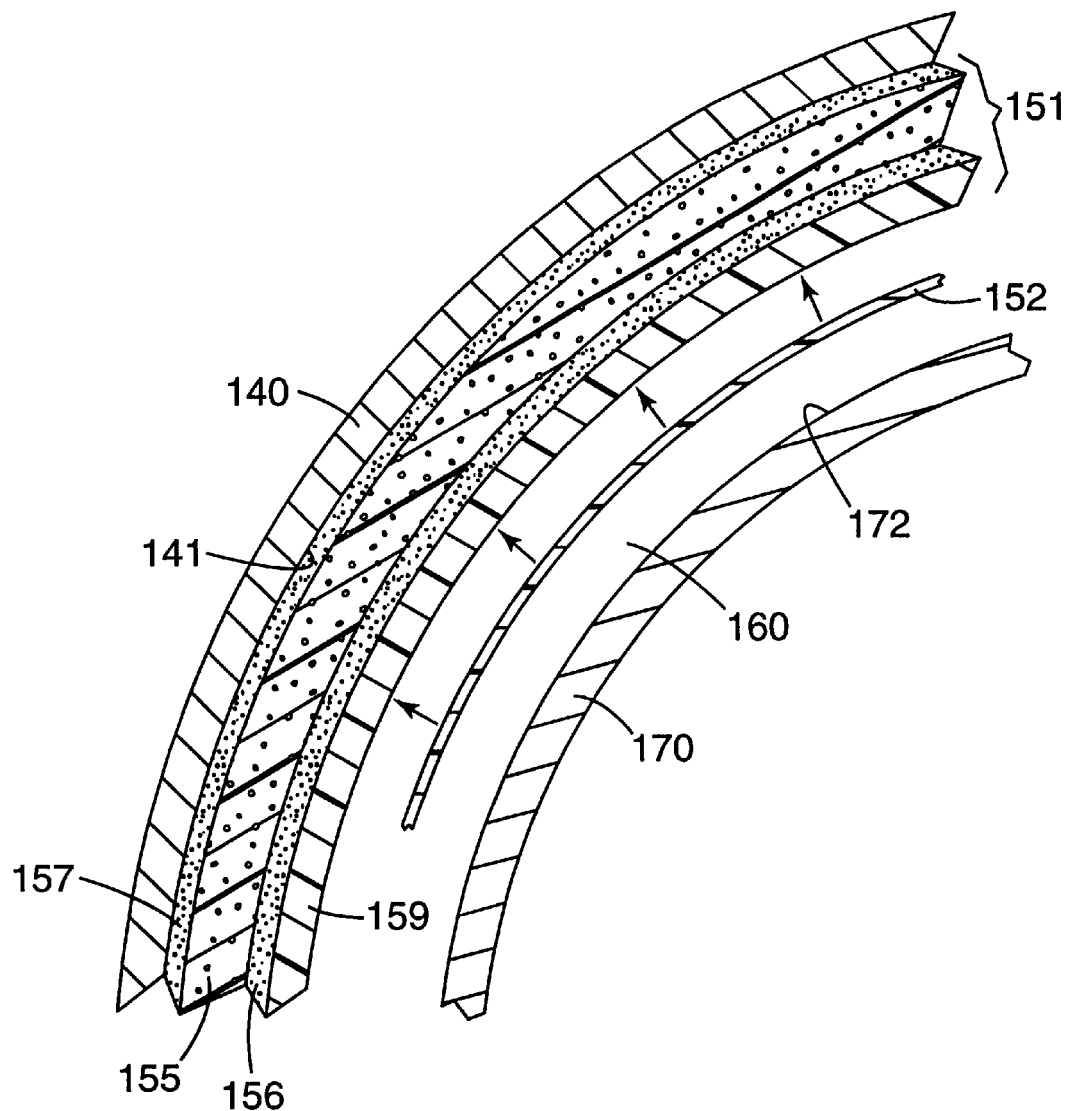
FIG. 8a is an enlarged view, in cross section, of a fluid transport tape affixed to the outer skin of an aircraft fuselage according to the invention.

Referring to FIG. 8a, a portion of a fluid transport tape assembly 151 according to the invention is shown as affixed to the interior surface 141 of the outer skin wall 140. The tape assembly 151 is constructed as described herein and includes a fluid transport film 159 affixed to a fire retardant layer 155 by a first skin adhesive layer 156. Fire retardant layer 155 may comprise a fire retardant foam material or other suitable fire retardant material, as previously described. The fluid transport film 159 and the fire retardant layer 155 is adhesively affixed to one another by first skin adhesive layer 156 while a second skin adhesive layer 157 holds the tape assembly 151 to the interior surface 141 of the outer skin wall 140. The surface of the fluid control film 159 is constructed to include a plurality of fluid flow channels as described herein to direct the flow of fluid along the surface of the fluid control film 159. The tape assembly 151 may optionally be constructed to include a cap layer 152 applied over the channels and affixed to the fluid control film 159. Cap layer 152 may be included to further define the channels on the surface of the film 159 in an active fluid transport system.

Figure 8B:
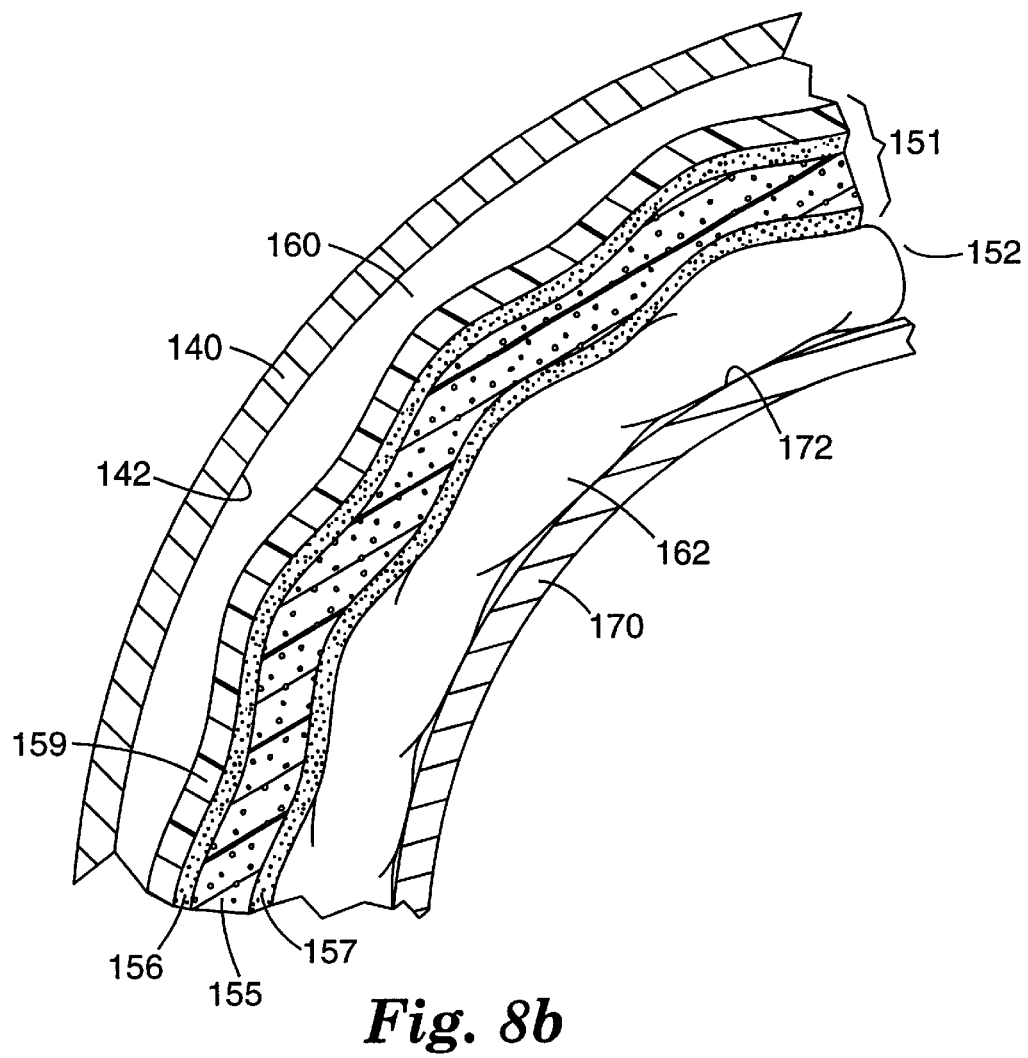
FIG. 8b is an enlarged view, in cross section, of a fluid transport tape affixed to the insulation blanket within an aircraft according to the invention.

Referring to FIG. 8b, another aspect of the invention is illustrated wherein the fluid transport tape assembly 151 is affixed directly to the insulation blanket 162 within the interstitial space 160. Second skin adhesive layer 157 holds the tape assembly 151 to the surface 141 of the insulation blanket 162, leaving an interstitial space between the fluid transport film 159 and the inner surface 142 of the outer skin wall 140.

Figure 8C:
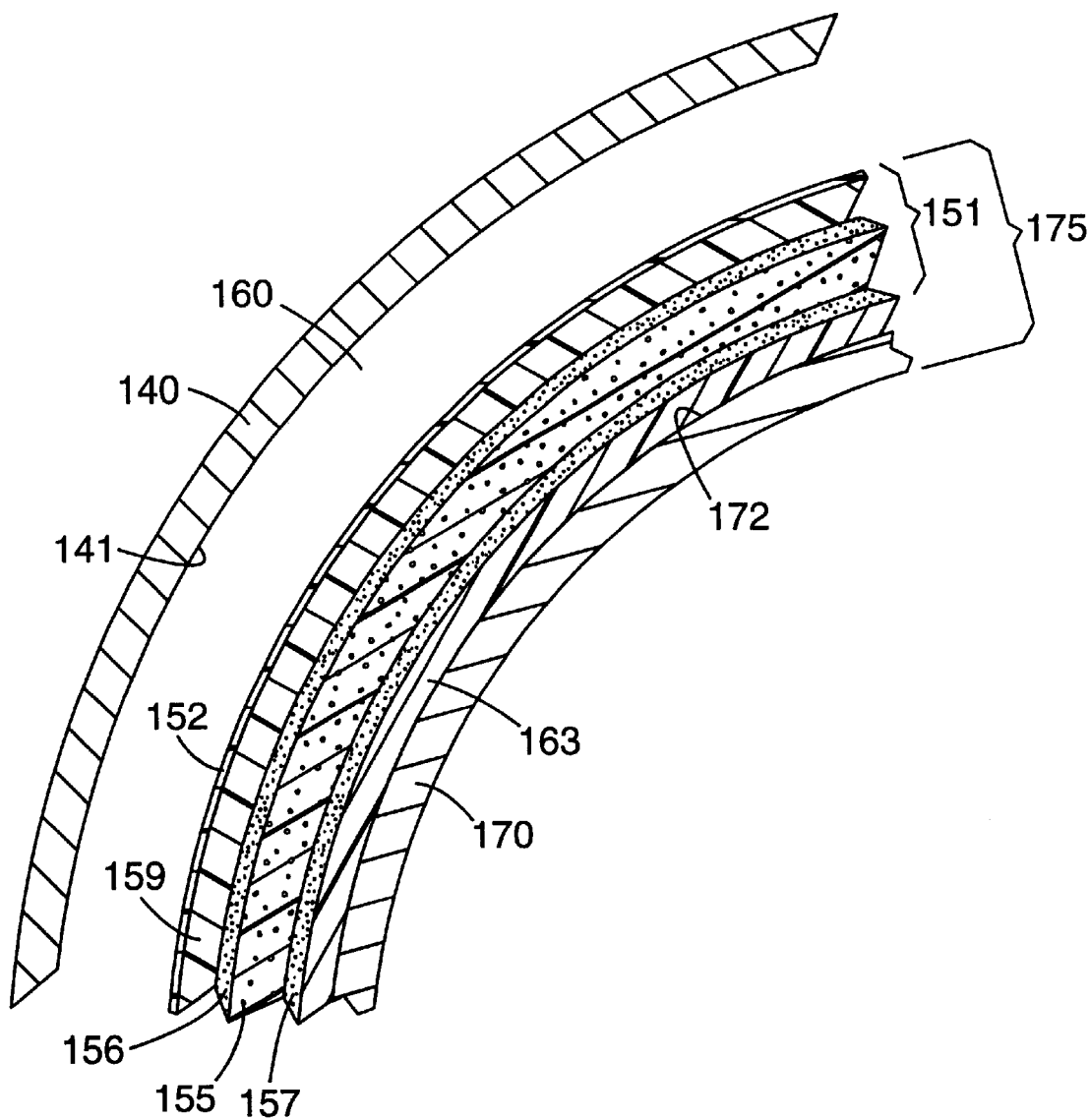
FIG. 8c is an enlarged view, in cross section, of a fluid transport tape integrated with an interior panel of an aircraft fuselage according to the invention.

The fluid transport tapes of the invention can also be used in an aerospace application in an embodiment wherein the fluid transport tape integrates the insulation and interior wall of an aircraft. Referring to FIG. 8c, the interior wall 170 has a thermal and accoustical insulation layer 163 and a fluid transport tape assembly 151, optionally including a cap layer 152, to comprise an integrated panel assembly 175.

Those skilled in the art will appreciate that the inner wall 170 is typically constructed from a series of similar panels normally comprised of a composite material. The individual panels are connected to one another to form a cohesive structure capable of sealing the inner compartment of an aircraft. In an aspect of the invention, it is contemplated that the fluid transport tape assembly 151 may be placed on individual panels along an edge thereof. In this manner, the tape assembly may be partially affixed to a first panel and, in a completed construction of the inner compartment, the tape 151 may also be affixed, in part, to a second panel adjacent to the first panel so that the tape 151 serves also to seal or assist in sealing adjacent panels in the construction of the aircraft inner compartment.

Figure 8D:
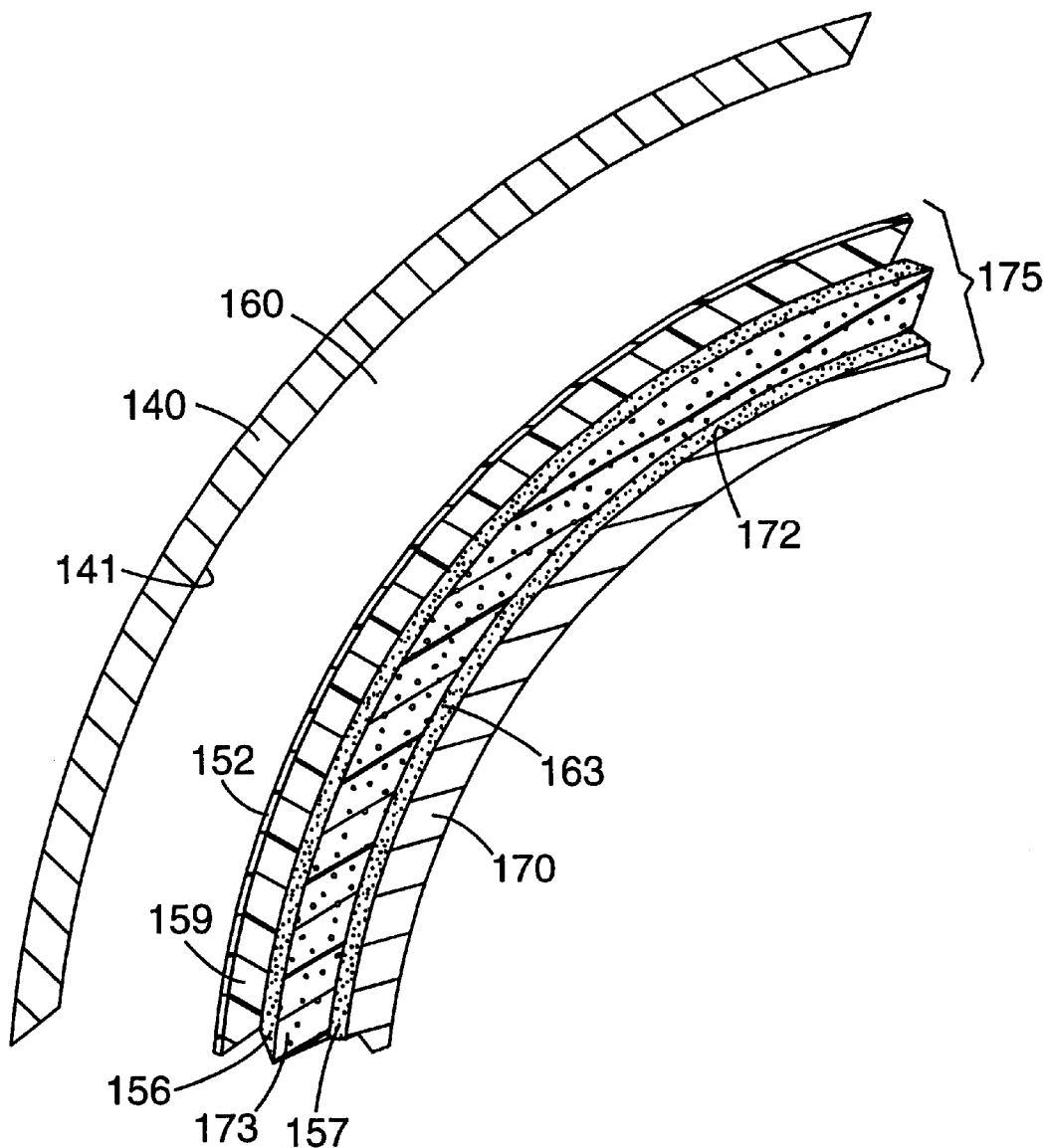
FIG. 8d is an enlarged view, in cross section, of a fluid transport tape integrated with an interior panel of an aircraft fuselage according to still another aspect of the invention.

In another embodiment shown in FIG. 8d, the integrated panel assembly 175 may incorporate a combined layer 173 that functions as both a flame retardant layer supporting the fluid transport film 159 and as a thermal-accoustic insulation layer overlying the inner wall 170. The fluid transport film 159 promotes the integration of the insulation and the interior wall panel because the fluid transport film 159 wicks fluid away and transports the fluid to the bilge of the aircraft. In this configuration, the film 159 facilitates panel to panel sealing by covering the joints or seams where adjacent panels abut one another in the construction of the inner compartment thereby preventing moisture ingress into the interior compartment of the aircraft. The channels in the fluid transport film 159 provide a means for directing the fluid away from a surface to protect the surface from undesired moisture. Additional advantages of the integrated panel assembly 175 include reduced costs for installation and improved access for inspection of the interstitial space.

In applications where a fluid transport film is adhesively attached to metallic surfaces that are normally subject to corrosion, a corrosion inhibiting agent may be included in the adhesive compositions associated with the fluid tranport tape. The intimate contact between the adhesive and the surface to which the adhesive is adhered is well suited to applying corrosion inhibiting agents to the metallic surface through the adhesive. Industries where such corrosion prevention is particularly desirable include the transportation, shipping and aerospace industries.

The fluid transport tapes in the foregoing aerospace application may comprise passive systems and active systems. Active systems according to the invention would typically include additional components similar to those described herein. For example, an active system would include the foregoing fluid transport assembly having a cap layer disposed over the film to define a plurality of discrete channels capable of directing the flow of fluid along the length of the film. In another embodiment the outer skin wall 140 may serve as the cap layer 152. A potential source, such as a vaccum source, would be positoned within the interstitial area within the fuselage at the lowermost portion thereof to provide a vacuum draw through the channels of the fluid transport assembly. A resevoir may be included in such a system for the temporary collection and retention of liquid prior to its disposal. The resevoir may comprise or include an optional absorbent to collect and hold the collected fluid. Disposal of the thus collected fluid may be accomplished in any manner, such as by disposal of the fluid through the drain 166 (shown in FIG. 7).

As mentioned previously, suitable fluid transport film components of the present invention may be made through a process such as extrusion, injection molding, embossing, hot stamping, etc. In embossing, a substrate (e.g., a thermoplastic material) is deformed or molded. This process is usually performed at an elevated temperature and perhaps under pressure. The substrate or material is preferably made to replicate or approximately replicate the surface structure of a master tool. Such a process can be used to produces relatively small (e.g., microscopic) structures and is sometimes referred to as microreplication. A suitable microreplication process is described in U.S. Pat. No. 5,514,120, incorporated in its entirety herein by reference thereto.

The articles of this invention have the advantage of allowing a wide variety of product designs. Where a resevoir is to be included within the design of the invention, such a resevoir may include or consist of an absorbent material. Suitable product designs may incorporate the increased surface area afforded by use of the absorbent material, thereby allowing for management of higher liquid volumes. Suitable absorbent materials include fibrous textile type materials, including woven, non-woven, knit, and stitch bonded materials or absorbent foams. Alternatively, the absorbent can comprise an absorbent polymer such as a hydrocolloid or hydrophilic polymer such as a supersorber. The hydrocolloid (e.g., starch, modified cellulose, gelatin or other protein, polysaccharide, etc) or supersorber (e.g., modified starch, acrylates, starch/acrylate copolymers, acylamides and other vinyl polymers, etc.) may be immobilized in a matrix such as a hydrophobic matrix of conventional hydrocolloid dressings or may alternatively be part of a hydrophilic gel matrix (e.g., a UV or E-beam cured acrylate). The absorbent may also comprise both a fibrous textile and an absorbent polymer. The absorbent pad may optionally contain an antimicrobial agent.

As described above, the invention provides fluid transport tapes which, in one or more embodiments, comprise a fluid transport film adhered, affixed or otherwise associated with a foam backing. In one embodiment, the foam backing comprises a fire retardant in a polymeric foam matrix and includes a skin adhesive associated with at least one, and typically both, of the major surfaces of the polymeric foam matrix. The foam may also comprise one or more expanded polymer microspheres which may be capable of further expansion if heated. The foam backing may be provided as a sheet having first and second major surfaces. One of the major surfaces of the foam sheet may be attached (e.g., with a pressure sensitive adhesive) to the fluid transport film while the other major surface of the film may be attached to a suitable substrate. Thus, the foam backings serve to provide fluid transport tapes comprising the foregoing fluid transport films. The tapes that may be affixed to any of a variety of surfaces or substrates. The skin adhesive applied to the major surface(s) of the foam is typically formulated without fire retardant.

In the aforementioned aerospace applications, a fire retardant is normally to be included in at least the foam layers or other backings used in the fluid transport tapes. Fire retardancy of the articles of the invention is desired and normally required by industry safety and/or legal requirements.

Fluid transport films can be formed from any polymeric materials suitable for casting or embossing including, for example, polyolefins, polyesters, polyamides, poly(vinyl chloride), polyether esters, polyimides, polyesteramide, polyacrylates, polyvinylacetate, hydrolyzed derivatives of polyvinylacetate, etc. Polyolefins are generally preferred, particularly polyethylene or polypropylene, blends and/or copolymers thereof, and copolymers of propylene and/or ethylene with minor proportions of other monomers, such as vinyl acetate or acrylates such as methyl and butylacrylate. Polyolefins are preferred because of their excellent physical properties, ease of processing, and typically lower cost than other thermoplastic materials having similar characteristics. Polyolefins readily replicate the surface of a casting or embossing roll. They are tough, durable and hold their shape well, thus making such films easy to handle after the casting or embossing process. Hydrophilic polyurethanes are also preferred for their physical properties and inherently high surface energy. Alternatively, fluid transport films can be cast from thermosets (curable resin materials) such as polyurethanes, acrylates, epoxies and silicones, and cured by exposure radiation (e.g., thermal, UV or E-beam radiation, etc.) or moisture. These materials may contain various additives including surface energy modifiers (such as surfactants and hydrophilic polymers), plasticizers, antioxidants, pigments, release agents, fire or flame retardants, antistatic agents and the like. Suitable fluid transport films also can be manufactured using pressure sensitive adhesive materials. In some cases the channels may be formed using inorganic materials (e.g., glass, ceramics, or metals). Preferably, the fluid transport film substantially retains its geometry and surface characteristics upon exposure to liquids.

The fluid control film may be formed from Tenite polyethylene 18BOA (available from Eastman Chemical Corporation, Kingsport, Tenn.) with 1% TRITON™ X-35 non-ironic surfactant. Also, a second body layer may be bonded (e.g., by coextrusion) to the bottom side of the backing layer. The second body layer may be formed from PE Eastman Tenite polyethylene 18BOA only (with no surfactant). In one embodiment, the nominal overall height of the fluid control film may be about 11 mils, with the depth of the backing layer being approximately 1 mil., and the depth of the second layer being approximately 2 mil. In another embodiment, the total caliper (height) of the fluid control film may be about 15 mil., with the additional height being provided by forming the peaks, as described herein. In addition, the fluid control film may include a tie layer on a bottom side thereof.

Most typically, the aforementioned skin adhesive layers are pressure sensitive adhesive, and the adhesive is generally formulated without fire retardant materials therein. Notwithstanding, small amounts of fire retardant may also be included within the skin adhesives at concentrations that are effective to impart fire retardant properties to the adhesive while not significantly diminishing the tack of the adhesive. Specifically, it may be desirable to add a small amount of fire retardant to the skin adhesive in very thin (i.e., less than about 0.635 mm (0.025 inches) fire retardant foam articles. The amount of fire retardant added to the skin adhesive is generally no greater than about 30 weight percent of the total weight of skin adhesive, typically no greater than about 20 weight percent, more typically no greater than about 10 weight percent, and most often no greater than about 5 weight percent.

Suitable skin adhesives for use in the articles of the present invention include any adhesive that provides acceptable adhesion to a variety of polar and non-polar substrates. Pressure sensitive adhesives are generally acceptable. Suitable pressure sensitive adhesives include those based on acrylic polymers, polyurethanes, thermoplastic elastomers such as those commercially available under the trade designation KRATON (e.g., styrene-isoprene-styrene, styrene-butadiene-styrene and combinations thereof) and other block copolymers, polyolefins such as poly-alpha-olefins and amorphous polyolefins, silicones, rubber based adhesives (including natural rubber, polyisoprene, polyisobutylene, butyl rubber etc.) as well as combinations or blends of these adhesives. The adhesive component may contain tackifiers, plasticizers, rheology modifiers, fillers, fibers, crosslinkers, antioxidants, dyes, colorants, conductive particulates, flame retardants, corrosion inhibitors as well as active components such as an antimicrobial agent.

A group of pressure sensitive adhesives known to be useful in the present invention are, for example, the acrylate copolymers described in U.S. Pat. No. RE 24,906, and particularly a copolymer comprising a weight ratio of from about 90:10 to about 98:2 iso-octyl acrylate: acrylic acid copolymer. Also acceptable is a copolymer comprising a weight ratio of about 90:10 to about 98:2 2-ethylhexyl acrylate:acrylic acid copolymer, and a 65:35 2-ethylhexyl acrylate:isobornyl acrylate copolymer. Useful adhesives are described in U.S. Pat. Nos. 5,804,610 and 5,932,298, both of which are incorporated herein in their entireties by reference thereto. The inclusion of antimicrobial agents in the adhesive is also contemplated, such as is described in U.S. Pat. Nos. 4,310,509 and 4,323,557 both of which are incorporated in their entireties herein by reference thereto. Blends of acrylic adhesives and rubber based adhesives may also be used such as is described in PCT International Publication Number WO 01/57152 which is incorporated in its entirety herein by reference thereto.

In some embodiments, it is desired to increase the level of adhesion by providing a primer or other surface enhancement to the substrate. For certain substrate materials with low energy surfaces, a preferred primer comprises a polymer blend of a modified block copolymer comprising a polystyrene block and a polydiene block, or, a hydrogenated polydiene block and a polymer comprising a polymerization reaction product of two or more mono-ethylenically unsaturated monomers where at least one of the monomers is an acrylic or methacrylic acid ester of a non-tertiary alcohol and at least one of the monomers is a nitrogen-containing monomer. One such primer is commercially available from 3M Company ("3M") under the trade designation "Primer 94". Preferred adhesives to use with a primer such as "Primer 94" or other suitable primer, include adhesives that have a carboxylic acid functional group, such as an acrylic acid functional group. Preferably, the amount of acrylic acid is 1–12 weight percent of the adhesive. Examples of suitable adhesives include copolymers of acrylic acid with isooctyl acrylate or 2-ethyl hexyl acrylate and isobornyl acrylate, further crosslinked with less than 0.5% by weight of a difunctional crosslinker.

Any of a variety of different polymer materials may be used in the formulation of foam layers for use as backings herein. These polymer materials include elastomers, rubbers, thermoplastic elastomers, rubber based and acrylic adhesives and blends thereof. Typically, the polymer resins are of the type that are suitable for melt extrusion processing, as described in U.S. Pat. No. 6,103,152 (Gehlsen et al.) issued on Aug. 15, 2000, incorporated in its entirety herein by reference thereto. It may be desirable to blend two or more polymers having chemically different compositions. The physical properties of the foam can be optimized by varying the types of components used in creating the foam and by varying their relative concentrations. A particular resin is generally chosen or selected based upon the desired properties of the final foam-containing article.

One group of polymers useful in the manufacture of the foams of the present invention include acrylate and methacrylate polymers and copolymers and combinations thereof. Such polymers can be formed by polymerizing one or more monomeric acrylic or methacrylic esters of nontertiary alkyl alcohols, with the alkyl groups having from 1 to 20 carbon atoms. Suitable acrylate monomers include methyl acrylate, ethyl acrylate, n-butyl acrylate, lauryl acrylate, 2-ethylhexyl acrylate, cyclohexyl acrylate, isooctyl acrylate, octadecyl acrylate, nonyl acrylate, decyl acrylate, and dodecyl acrylate. The corresponding methacrylates are useful as well. Also useful are aromatic acrylates and methacrylates, e.g., benzyl acrylate and cyclobenzyl acrylate.

Optionally, one or more monoethylenically unsaturated co-monomers may be polymerized with the acrylate or methacrylate monomers; the particular amount of co-monomer is selected based upon the desired properties of the polymer. One group of useful co-monomers includes those having a homopolymer glass transition temperature greater than the glass transition temperature of the acrylate homopolymer. Examples of suitable co-monomers falling within this group include acrylic acid, acrylamide, methacrylamide, substituted acrylamides such as N,N-dimethyl acrylamide, itaconic acid, methacrylic acid, acrylonitrile, methacrylonitrile, vinyl acetate, N-vinyl pyrrolidone, isobornyl acrylate, cyano ethyl acrylate, N-vinylcaprolactam, maleic anhydride, hydroxyalkylacrylates, N,N-dimethyl aminoethyl (meth) acrylate, N,N-diethylacrylamide, beta-carboxyethyl acrylate, vinyl esters of neodecanoic, neononanoic, neopentanoic, 2-ethylhexanoic, or propionic acids (e.g., available from Union Carbide Corp. of Danbury, Conn. under the designation VYNATES, vinylidene chloride, styrene, vinyl toluene, and alkyl vinyl ethers.

Another group of monoethylenically unsaturated co-monomers which may be polymerized with the acrylate or methacrylate monomers includes those having a homopolymer glass transition temperature less than the glass transition temperature of the acrylate homopolymer. Examples of suitable co-monomers falling within this class include ethyloxyethoxy ethyl acrylate (Tg=−71° C.) and a methoxypolyethylene glycol 400 acrylate (Tg of −65° C.; available from Shin Nakamura Chemical Co., Ltd. under the designation NK ESTER AM-90G) and combinations thereof.

Another group of polymers useful in the manufacture of the foam includes polymers that are immiscible with acrylic adhesives. Examples include semicrystalline polymer resins such as polyolefins and polyolefin copolymers (e.g., based upon monomers having between 2 and 8 carbon atoms such as low density polyethylene, high density polyethylene, polypropylene, ethylene-propylene copolymers, etc.), polyesters and co-polyesters, polyamides and co-polyamides, fluorinated homopolymers and copolymers, polyalkylene oxides (e.g., polyethylene oxide and polypropylene oxide), polyvinyl alcohol, ionomers (e.g., ethylene-methacrylic acid copolymers neutralized with base), and cellulose acetate and combinations thereof. Other examples of immiscible polymers include thermoplastic polyurethanes, aromatic epoxies, polycarbonate, amorphous polyesters, amorphous polyamides, ABS copolymers, polyphenylene oxide alloys, ionomers (e.g., ethylene-methacrylic acid copolymers neutralized with salt), fluorinated elastomers, polydimethyl siloxane, ethylene propylene rubber, thermoplastic elastomers and combinations thereof.

Another group of polymers useful as a foam in the present invention includes elastomers containing ultraviolet radiation-sensitive groups. Examples include polybutadiene, polyisoprene, polychloroprene, random and block copolymers of styrene and dienes (e.g., SBR), and ethylene-propylene-diene monomer rubber and combinations thereof.

Another group of polymers useful as a foam in the present invention includes pressure sensitive and hot melt adhesives prepared from non-photopolymerizable monomers. Such polymers can be adhesive polymers (i.e., polymers that are inherently adhesive), or polymers that are not inherently adhesive but are capable of forming adhesive compositions when compounded with tackifiers. Specific examples include polyurethanes, poly-alpha-olefins (e.g., polyoctene, polyhexene, and atactic polypropylene), block copolymer-based adhesives, natural and synthetic rubbers, silicone adhesives, ethylene-vinyl acetate, and epoxy-containing structural adhesive blends (e.g., epoxy-acrylate and epoxy-polyester blends) and combinations thereof.

One or more expanded polymer microspheres may typically be included in the polymer foam. An expandable polymeric microsphere comprises a polymer shell and a core material in the form of a gas, liquid, or combination thereof. Upon heating to a temperature at or below the melt or flow temperature of the polymeric shell, the polymer shell will expand. Examples of suitable core materials include propane, butane, pentane, isobutane, neopentane, or similar material and combinations thereof. The identity of the thermoplastic resin used for the polymer microsphere shell can influence the mechanical properties of the foam, and the properties of the foam may be adjusted by the choice of microsphere, or by using mixtures of different types of microspheres. For example, acrylonitrile-containing resins are useful where high tensile and cohesive strength are desired in a low density foam article. This is especially true where the acrylonitrile content is at least 50% by weight of the resin used in the polymer shell, generally at least 60% by weight, and typically at least 70% by weight.

Examples of suitable thermoplastic resins that may be used as the shell include acrylic and methacrylic acid esters such as polyacrylate; acrylate-acrylonitrile copolymer; and methacrylate-acrylic acid copolymer. Vinylidene chloride-containing polymers such as vinylidene chloride-methacrylate copolymer, vinylidene chloride-acrylonitrile copolymer, acrylonitrile-vinylidene chloride-methacrylonitrile-methyl acrylate copolymer, and acrylonitrile-vinylidene chloride-methacrylonitrile-methyl methacrylate copolymer may also be used, but may not be desired if high strength is sought. In general, where high strength is desired, the microsphere shell will have no more than 20% by weight vinylidene chloride and typically no more than 15% by weight vinylidene chloride. High strength applications may require microspheres with essentially no vinylidene chloride. Halogen free microspheres may also be used in the foams of the invention.

As was mentioned, the foam in the articles of the invention comprises polymeric microspheres. Examples of suitable commercially available expandable polymeric microspheres include those available from Pierce Stevens (Buffalo, N.Y.) under the designations "F30D," "F80SD," and "F100D." Also suitable are expandable polymeric microspheres available from Akzo-Nobel under the designations EXPANCEL 551, EXPANCEL 461, EXPANCEL 091 and EXPANCEL 092 MB 120.

The amount of expandable microspheres is selected based upon the desired properties of the foam article. In general, the higher the microsphere concentration, the lower the density of the foam. The amount of microspheres in the polymer resin typically ranges from about 0.1 parts by weight to about 20 parts by weight (based upon 100 parts of polymer resin), more preferably from about 0.5 parts by weight to about 10 parts by weight.

In addition to including the fire retardant materials within the formulation of the foam layer, the foam may also include a number of other additives. Examples of suitable additives include tackifiers (e.g., rosin esters, terpenes, phenols, and aliphatic, aromatic, or mixtures of aliphatic and aromatic synthetic hydrocarbon resins), plasticizers, pigments, dyes, non-expandable polymeric or glass microspheres, reinforcing agents, hydrophobic or hydrophilic silica, calcium carbonate, toughening agents, fibers, fillers, nanoparticles such as nanoclays, conductive particles, antioxidants, finely ground polymeric particles such as polyester, nylon, or polypropylene, stabilizers, and combinations thereof. Chemical blowing agents may be added as well. The foregoing additional agents and components are generally added in amounts sufficient to obtain a foam article having the desired end properties.

Fire retardants suitable for inclusion in the foams of the present invention include intumescent, fire retardants and/or non-intumescent antimony free fire retardants which are generally present in the foam at a concentration of between about 20 wt. % and about 60 wt. %. Examples of suitable fire retardants for use in the foams described herein include those commercially available from Clariant Corporation of Charlotte, N.C., under the designation EXOLIT, including those designated IFR 23, AP 422, AP 423, AP 452(TP), AP 462, AP 740(TP), AP 750, AP 751 (TP), and AP 752(TP), all of which are non-halogenated fire retardants comprising ammonium polyphosphate and synergists. Synergists are other fire retardant materials that, when combined with another fire retardant, provide enhanced fire retardant properties greater than the additive properties of the two fire retardant materials. EXOLIT OP grade materials, such as, OP 550, OP 910, OP 920(TP), OP 921(TP), OP 1100(TP), EXOLIT 5060, EXOLIT 5073, EXOLIT 5085(VP), and EXOLIT 5087, also from Clariant Corporation, based on organophosphorous compounds are also useful as well as EXOLIT RP grades of red phosphorus materials, such as, RP 622, RP 650, RP 652, RP 654, RP 658, RP 659(TP), RP 683(TP), RP 689(TP), RP 692, RP 693, and RP 694. Other non-halogenated fire retardants that may be used include FIREBRAKE ZB and BORGARD ZB which are zinc borate and zinc borate hydrate respectively, ammonium borate/diborate/tetraborate tetrahydrate, ammonium pentaborate ×8H$_2$O, FYREX which is a mixture of diammonium and monoammonium phosphate, available from Akzo Nobel, Gallipolis Ferry, W. Va., triphenyl phosphate, di-melamine phosphate, potassium bicarbonate, potassium aluminum sulfate, MELAPUR 25 and MELAPUR p-46 which are both melamine cyanurates; MELAPUR 200 which is melamine polyphosphate, all three of which are available from DSM Melamine Americas, Inc. Westwego, La.; AMGARD NH which is melamine phosphate, AMGARD NP which is ethylenediamine phosphate, ANTIBLAZE NP which is an alkyl amine phosphate, and ANTIBLAZE NF both of which is which is an alkyl amine phosphate salt, all of which are available from Albright & Wilson Americas Inc., Richmond, Va.; REOGARD 1000 which is a proprietary intumescent fire retardant commercially available from Great Lakes Chemical Corp., West Lafayette, Ind.; aluminum trihydrate (ATH), magnesium oxide, and magnesium hydroxide. Useful halogenated phosphate fire retardants that may be used include TCEP (tris(2-chloroethyl)phosphate) and TCPP (tris (2-chloroisopropyl)phosphate) both of which are available from Clariant Corporation, and FR 370 (tris (tribromoneopentyl) phosphate) available from Dead Sea Bromine Group, Beer Shiva, Israel.

Blends of one or more fire retardants may also be used in the foams of the invention. Suitable blends include blends of EXOLIT AP 750 and FR370 and EXOLIT IFR 23 and FR-370 in a weight ratio ranging from about 10:90 (5:95) to about 90:10 (95:5), and blends of mono-ammonium phosphate, ammonium sulfate, and magnesium aluminum silicate available as FORAY from Ansul Incorporated. Blends of one or more fire retardants and a synergist may also be used in the foams of the invention. Suitable synergists include talc, magnesium compounds, zinc compounds such as zinc borate, Fe2O3, MoO3, special zeolite, boroxo siloxane elastomer, which are discussed in article "Influence of Modified Rheology on the Efficiency of Intumescent flame Retardant Systems", P. Anna et al., *Polymer Degradation and Stability*, Vol. 74 (3), 2001, pp. 423 to 426. A synergist for both brominated and phosphorus fire retardants is CIBA FLAMESTAB NOR 116 fire retardant material available from Ciba, Tarrytown, N.Y. There appears to be a synergy between the ammonium polyphosphate based intumescent fire retardants with brominated phosphate (FR 370), melamine phosphate, and/or melamine polyphosphate fire retardants. While halogenated fire retardant materials are generally not preferred, some halogenated materials may be effective in the present invention. For example FR 370 which is tris(tribromoneopentyl) phosphate is a very effective fire retardant and is currently has not been identified by environmental groups as a troublesome substance. Selection of the fire retardant system will be determined by various parameters, for example, the industry standard for the desired application, and by composition of the foam polymer matrix.

Other materials may be used in tapes of the present invention as additional fire retardant layers. These materials include a multilayer laminate sheet construction comprising high-temperature-stable polymeric material and non-metallic fibers, as taught in co-pending U.S. patent application Ser. No. 09/691,575, filed Oct. 18, 2000, the disclosure of which is incorporated in its entirety herein by reference thereto. These materials may comprise a separate layer in within the tapes of the invention and may be used in conjunction with the foregoing foams. Suitable high temperature stable polymeric materials include, but are not limited to, polyamides, polyvinyl fluorides, silicone resins, polyimides, polytetrafluoroethylenes (PTFEs), polyesters, polyaryl sulfones, polyetheretherketones, polyester amides, polyester imides, polyethersulfones, polyphenylene sulfides and combinations thereof. Typical high temperature stable polymeric materials include polyvinyl fluorides and polyimides due to their greater high temperature stability. High temperature stable polymeric materials are commercially available. Representative examples thereof include polymide film, available, for example, under the trade designation "KAPTON"; polyvinyl fluoride film available, for example, under the trade designation "TEDLAR"; and polytetrafluoroethylene film available, for example, under the trade designation "TEFLON"; all available from E. I. duPont deNemours & Company, Wilmington, Del.

Suitable non-metallic fibers include, but are not limited to, glass fibers, aramid fibers, crystalline ceramic oxide (including quartz) fibers, silicon nitride fibers, silicon carbide fibers, oxidized polyacrylonitrile fibers, carbon fibers, and combinations thereof. The fibers may be provided as individual fibers or as bundled fibers, possibly varying in length from a few centimeters to several meters. Preferably, the non-metallic fibers are glass fibers, crystalline ceramic oxide fibers, or combinations thereof. It is understood that crystalline ceramic oxide fibers may contain minor amounts of glassy phases at the grain boundaries. More typically, the second substrate comprises primarily ceramic oxide fibers.

In the embodiments that include a fire retardant foam sheet adhered to a fluid transport film, an adhesive layer or skin adhesive may be associated with the fire retardant foam sheet by, for example, co-extruding the extrudable microsphere-containing fire retardant foam composition with one or more extrudable adhesive compositions, as described in greater detail, below. The adhesive compositions are most often formulated and/or selected without added fire retardant. The final article is an adhesive article in the form of the aforementioned fluid transport tape wherein the foam material comprises the substrate or backing for the tape. Regardless of the method of manufacture, the skin adhesive will typically be a pressure sensitive adhesive applied to one of the major surfaces of the foam during the manufacturing process. An additional skin adhesive may later be added to the second major surface when the foam layer is to be added as a support for the fluid transport film. The skin adhesive can be laminated to the second major surface of the fire retardant foam, or the foam can be directly extruded or coated onto the skin adhesive after the skin adhesive has been applied to a release liner, for example. Once the skin adhesive is applied to the second major surface of the foam, the fluid transport film may be laminated thereto to provide the fluid transport assembly of the invention.

Other polymer compositions may be co-extruded with the polymer foam such as relatively high modulus polymer compositions for stiffening the foam (semi-crystalline polymers such as polyamides and polyesters), relatively low modulus polymer compositions for increasing the flexibility of the foam (e.g., plasticized polyvinyl chloride), and additional foam compositions.

In another aspect of the invention, the fluid transport assemblies of the invention can have a high peel adhesion when applied to a panel, while also being cleanly removable from the panel through the incorporation of a stretch release mechanism within the foam backings of the articles. The desired characteristics of a stretch release foam tape backing according to the invention include (1) foam split strength greater than about 2.64 kN/m (>15 lbs/inch); (2) tensile break strength that is higher than the force needed to remove the tape from a surface so that the tape will not tear or break upon stretch release; (3) other mechanical properties such as relatively low yield stress and good elongation at break (e.g., greater than 150%); and (4) exhibit significant strain hardening behavior (at least 150% higher tensile strength than the yield stress to stretch release it) or exhibit greater than 50% elastic recovery.

To provide stretch release properties and to further reinforce the articles of the invention, the foam core, the skin adhesives or both the foam and the adhesives may include reinforcing materials comprising viscoelastic or elastic microfibers formed in situ during the manufacturing process described herein. The microfibers may be incorporated into the foam core along with the foregoing fire retardant materials or in the absence of fire retardant materials. The microfibers are included in the formulations of the foam, one or both of the skin adhesives, or in the foam and one or both of the skin adhesives. Such microfibers may be included in the formulation of the foam and/or adhesives when the assemblies of the invention are to be used in applications where the stretch-release properties imparted by the fibers are needed to cleanly and easily remove the assemblies of the invention from a surface. Suitable microfibers include those formulated according to the teachings of pending U.S. patent application Ser. No. 09/764,478, incorporated in its entirety herein by reference thereto.

In specific embodiments, the reinforcing microfibers are viscoelastic and comprise semi-crystalline polymer (e.g., having both amorphous and crystalline domains). Specific embodiments of semi-crystalline polymers include polycaprolactone (PCL), polybutene (PB), copolymers derived from ethylene and at least one other alpha-olefin monomer (e.g. polyolefin copolymers and terpolymers), ultra low density polyethylene (e.g. having a density below 0.915 grams/cubic centimeter, such as ATTANE 4201, 4202, 4203, 4301 and 4404 commercially available from Dow Chemical Co. or), linear low density polyethylene (e.g. having a density between 0.915 and 0.94 grams/cubic centimeter, such as LL-3003, ECD-125, 377D60, 369G09, 363C32, 361C33, 357C32, 350D65, 350D64, 350D60, LL-3013, and LL-3001 commercially available from ExxonMobil Corp.), the DOWLEX series elastomers commercially available from Dow Chemical, metallocene polyolefin (e.g., EXACT 3040, 3024, 3139 commercially available from Exxon Mobil Corp.), and polyolefin plastomers (e.g., the AFFINITY series commercially available from Dow Chemical), metallocene copolymers (e.g., the ENGAGE series commercially available from Dupont-Dow Elastomers), and combinations of the foregoing materials. Examples of suitable reinforcing microfibers that are elastic include thermoplastic elastomers such as for example those comprising polyurethane, synthetic block copolymers, and combinations of the foregoing materials.

The reinforcing microfiber materials have measurable yield strength. In certain embodiments, the yield strength of the reinforcing material is less than about 30 MPa. The tensile break strength of the reinforcing material is typically at least about 150% of its yield strength. In specific embodiments, the tensile strength (according to ASTM D 882-97 at a crosshead speed of 12 inches/minute (30 centimeters/minute)) of the reinforcing material is higher than the tensile strength of the adhesive and/or the expanded foam. The reinforcing microfiber material should have a melting point above the use temperature of the adhesive/foam composition and should have a melting point above the storage temperature of the adhesive composition or any article manufactured with the adhesive composition. Both the use temperature and the storage temperature should not exceed the temperature at which either the foam or the adhesive decomposes. In certain embodiments, the reinforcing material has a melting point of at least 70° C. as determined by differential scanning calorimetry ("DSC") at a scanning rate of 10° C./minute, for example.

It is desirable for the reinforcing microfiber material to have a melt viscosity (as determined with a capillary viscometer) similar to the melt viscosity of the adhesive or the foam, as applicable, at the processing temperature of the method of this invention. The reinforcing microfiber material is preferably immiscible in (i.e. remains in a separate phase), but is compatible with, the material to which it is added during the manufacturing process (e.g., the polymer foam and/or the adhesive ingredients) so that the microfiber material can be substantially uniformly dispersed (i.e. distributed) in the adhesive or in the foam material. The reinforcing microfibers will form in situ in the machine direction of the foam or tape. In specific embodiments, during mixing, the microfiber forming resin is dispersed into the adhesive or foam formulations by a twin screw extruder as substantially spherical particles having an average diameter less than about 20 micrometers. Substantially continuous microfibers form during extrusion through the die. In certain embodiments, the reinforcing microfiber material has an average diameter less than about 10 micrometers.

Most typically, the reinforcing microfiber material exists as substantially continuous fibers in the adhesive and/or in the fire retardant foam composition. In one aspect of the invention, the fibers are unbroken for at least about 0.5 centimeters in the machine direction of the adhesive or foam, typically at least about 2 centimeters. In other embodiments, the substantially continuous fibers are continuous for at least about 5 centimeters and typically at least about 8 centimeters. According to another aspect of the invention, the substantially continuous fibers generally have a maximum diameter of about 0.05 to about 5 micrometers, preferably from about 0.1 to about 1 micrometers. According to another aspect of the invention, the aspect ratio (i.e. the ratio of the length to the diameter) of the substantially continuous fibers is greater than about 1000.

It has been found that a suitable chemistry useful in the present invention comprises microfibers of certain copolymers and terpolymers of polyalkylene resins including copolymers of polyoctene-ethylene and/or polyhexene-ethylene as well as polybutene-co-ethylene and the like. The microfibers will strain harden during the removal (stretch release) process so that their inclusion in the foam and/or adhesive provides a final material that will stretch and release from a substrate without breakage due to the strain hardening of the microfibers. In general, and without limitation, $C_3$–$C_{10}$ copolymers with ethylene are suitable for use in the manufacture of the reinforcing microfibers. The foregoing polyoctene-ethylene and/or polyhexene-ethylene copolymers are compatible with, but immiscible in, many polymers such as for example, acrylic and rubber/resin based block copolymer adhesives, and can be blended in the twin screw extruder, as described herein, to generate the microfibers in situ. In other words, the polymer of the microfiber is compounded with the polymer foam and foaming agent, and a continuous microfiber is generated in-situ by shear flow while a unidirectional microfiber reinforced composite core is being foamed.

In those embodiments where the reinforcing microfibers are included within the foam backings of the articles of the invention, the manufacturing process temperatures for the foams are typically chosen so that the temperatures within each of the temperature zones is between the melting point (low limit) of fiber polymer resin and the activation temperature (high limit) of a foaming agent (e.g., the polymer microspheres, chemical foaming agent, etc.). Moreover, the temperature of the die is generally no greater than about 60° C. over the melting point of the polymer of the microfiber so that the microfiber can effectively consolidate by crystallizing upon cooling.

The melting point of polymer used in the manufacture of the microfibers herein should be lower than the activation temperature of the foaming agent used, so that the foaming agent, fiber polymer and the foam matrix material can be blended homogeneously without pre-expanding the foaming agent in the mixing zone. The melting point of the polymer resin used in the manufacture of the microfibers is generally at least 20° C. lower than the activation temperature of foaming agent. Better results might be realized if the melting point of the polymer resin used in the manufacture of the microfibers is at least 30° C. lower or 40° C. lower than the activation temperature of the foaming agent.

If adhesive is applied to both of the major outer foam surfaces, the resulting foam is a three-layer article featuring a foam core with a skin adhesive on each of the major surfaces of the foam. The foam may be formulated to be fire retardant, stretch-releasable, or both. For a three layer A/B/C construction (adhesive A/foam B/adhesive C) another extruder and related equipment can be employed to permit another skin adhesive to be applied to the other major surface of the foam. In this construction, the major surfaces of the foam may be adhered to any of a variety of surfaces for use in applications where the fire resistant properties of the foam are desired and/or required. Moreover, the absence of fire retardant in the adhesive allows the foam to be adhered to a surface or substrate with the maximum degree of adhesion provided by the particular adhesive used. Such a three layer construction allows for the use of a skin adhesive suitable for adhering the foam to the fluid transport film, while also allowing for the use of another skin adhesive, applied on the other major surface of the foam, that is suitable for adhering the finished fluid transport assembly to a particular substrate or to allow for the final assembly to be adhered to any of a variety of substrates.

In another aspect of the invention, the fluid transport tapes herein can comprise a backing that includes, comprises or consists of a cleanly removable tape such as those described in co-pending U.S. patent application Ser. No. 10/118,120 filed Apr. 8,2002 and entitled "CLEANLY REMOVABLE TAPES AND METHODS FOR THE MANUFACTURE THEREOF," the entire disclosure of which is incorporated herein by reference thereto. These backings are provided as multi-layer tapes comprising: a first adhesive layer comprising a pressure sensitive adhesive; a core layer having an outer surface, the first adhesive layer adhered to at least a portion of the outer surface; and fibrous reinforcing material dispersed within the core layer, the fibrous reinforcing material imparting stretch release properties to the tape. The tape backings may include a second adhesive layer wherein the outer surface comprises a first major surface and a second major surface, the first adhesive layer being adhered to the first major surface, and the second adhesive layer being adhered to the second major surface. The first and second adhesives may be selected from any of a variety of materials such as acrylic polymers, polyurethanes, thermoplastic elastomers, block copolymers, polyolefins, silicones, rubber based adhesives, a blend of an acrylic adhesive and rubber based adhesive, and combinations of the foregoing. A fire retardant may be disposed in any of the first adhesive layer, the second adhesive layer, and the core layer, and the fire retardant may be selected from antimony free fire retardant, polybrominated biphenyl free fire retardant, intumescent fire retardant, and combinations thereof. Optionally, the tape may also include a synergist. In this case the skin adhesive may be up to 30 weight percent fire retardant.

Any of a variety of materials may be used in the formulation of a core layer for the tapes of the invention. For example, polymeric resins, including adhesives as well as blends thereof, may be used. Thermoplastic polymers and adhesives suitable for use as a core layer include those that are compatible with, but immiscible with the fibrous reinforcing material. It may be desirable to blend two or more polymers having chemically different compositions. The physical properties of the resulting core layer can be optimized by varying the types of components used in creating the tape and by varying their relative concentrations. A particular resin is generally chosen or selected based upon the desired properties of the final stretch releasable tape. The core layer typically contains one or more fire retardants, as described herein, and may be treated with adhesion promoters, binders, antistatic materials, and the like to impart additional properties thereto.

In another embodiment, the fluid transport film can be integrally constructed with a fire retardant material. The fire retardant material can comprise or otherwise be incorporated into the fluid control film or fluid transport film in a manner known to those skilled in the art. Examples of methods for the incorporation of fire retardant materials include lamination, insert molding, pulltrusion, hot embossing and the like.

In another embodiment, the fluid transport film can be contructed with a flame barrier material such as the flame barrier material commercially available under the trade designation "Nextel" from the 3M company. The flame barrier material can comprise or otherwise be incorporated into the fluid control film or fluid transport film in a manner known to those skilled in the art such as by lamination, insert molding, pulltrusion, hot embossing and the like.

There are several flammabilty tests which can be used to classify the performance of fire retardant articles depending upon the application, industry, or government regulations. An article can be rated for fire retardancy based on its flammability performance for any of the following properties: burn rate, burn length, self-extinguish time, burning drips, surface flammability, optical smoke generation, and analysis of type and concentration of toxic combustion gases. A fire retardant article can be classified as fire retardant by the following tests: UL 94, F.A.R. § 25.853 12 and 60 second Vertical Burn tests, ASTM E162, and ASTM E662, and BSS 7239. There are sometimes different fire retardant ratings for some tests based on flammability performance (i.e. for the UL 94 test, there are V-0, V-1, and V-2 ratings). In the rail transit industry, the maximum flame spread index (Is) is 35 for the Surface Flammability test ASTM E162 and maximum Specific Optical Density (Ds) for ASTM E662 is the following: Flaming and Non-Flaming Modes; Ds(1.5)=100 maximum, Ds(4.0)=200 maximum.

Additional embodiments of the fluid transport tapes of the invention are contemplated. For example, foam-backed fluid transport tapes can be made using the films described in pending U.S. patent application Ser. No. 09/778,524 ("Microstructured Surface Film Assembly For Liquid Acquisition And Transport"). Foam backings for use in the articles of the invention may also be constructed according to the teachings of co-pending U.S. patent application Ser. No. 10/066,990, filed Feb. 4, 2002; and U.S. patent application Ser. No. 10/067,047, filed Feb. 4, 2002. Flame retardant materials for use in the articles of the invention may also be constructed according to the teachings of co-pending U.S. patent application Ser. No. 09/691,575, filed Oct. 18, 2000, ("Laminate Sheet Material for Fire Barrier Applications"). Insulation blankets for use in articles of this are described in U.S. Pat. No. 5,759,659 to Sanocki et al.

Fluid transport devices of the present invention are applicable in numerous industrial and commercial applications. Structured surfaces having no cap layer (exposed to ambient conditions) are particularly suitable in evaporative and condensation collection applications, as well as gross fluid acquisition and removal applications. In addition to the aerospace applications mentioned herein, the fluid transport device with a cap layer has been found to be particularly suitable for use in flooring applications for acquisition and control of spilled liquids.

Further features of the preferred embodiment are set forth in the following non-limiting Examples.

EXAMPLES

In the test methods and examples below, the sample dimensions (typically the length) are approximate except for the width wherein the width was measured to the accuracy of the cutting tool.

Test Methods
Flammability Test Method

This test method is based on the criteria and procedures for showing compliance with F.A.R. § 25.853 (July 1990) but differs from F.A.R. § 25.853 (July 1990) in that the samples were conditioned at 50%±10% relative humidity for a minimum of 24 hours instead of the specified 50%±5%.

Samples were conditioned to 21.10° C.±2.80° C. (70°±5° F.) and at 50%±10% relative humidity for a minimum of 24 hours. Specimens were mounted in a U-shaped metal frame so that the two longitudinal edges and one transverse (narrow) edge were held securely in a vertical orientation, unsupported by and unattached to a substrate. The exposed area of the specimen was at least 50.8 mm (two inches) wide and about 304.8 mm (12 inches) long.

The samples were exposed to the flame from a Bunsen burner. The lower edge of the sample was about 19.1 mm (¾ inch) above the top edge of the burner. The flame was applied to the center line of the lower edge of the sample for 12 seconds or for 60 seconds as specified in the Examples. The flame time, burn length, and flaming time of dripping, if any, was recorded. The burn length was measured as the distance from the edge of the sample exposed to the flame to a point on the sample where burn damage directly attributable to flame impingement was no longer apparent. Areas on the sample indicating partial or complete consumption, charring, or embrittlement were included in the measurement of burn length. Areas showing soot, staining, warping of the surface, or discoloration were not included in the burn length, nor were areas where material appeared to have shrunk or melted due to heat.

F.A.R. § 25.853 (July 1990) subparagraphs (a)(1)(i) 60 second flame exposure require that the average burn length not exceed 152.4 mm (six inches), the average flame time after removal of the flame source not exceed 15 seconds, and drips not continue to flame for more than an average of 3 seconds after falling. F.A.R. § 25.853 (July 1990) subparagraphs (a)(1)(ii) 12 second flame exposure require the average burn length not exceed 203 mm (8 inches), the average flame time after removal of the flame source not exceed 15 seconds, and drips not continue to flame for more than an average of 5 seconds after falling.

90 Degree Peel Adhesion

ASTM D-3330 describes this test method.

Materials Used in the Examples

Certain commercially available materials were used in the Examples of the invention. These materials are listed below and are often referred to in the Examples with reference to their trade designations.

| Trade Designation | Description | Source |
|---|---|---|
| IRGACURE 651 | 2,2-dimethoxy-2-phenylacetophenone | Ciba Specialty Chemicals Corp, Tarrytown, NY |
| FR 370 | tris(tribromoneopentyl) phosphate | Dead Sea Bromine Group, Beer Shiva, Israel |

-continued

| Trade Designation | Description | Source |
|---|---|---|
| EXOLIT IFR 23 | flame-retardant system based on ammonium polyphosphate | Clariant Corporation, Charlotte, NC |
| FLAMESTAB NOR 116 | fire retardant synergist | Ciba Specialty Chemicals Corp, Tarrytown, NY |
| F100D | expandable polymeric microspheres having a shell composition containing acrylonitrile and methacrylonitrile | Pierce Stevens, Buffalo, NY |
| FTF | fluid transport film constructed according to Example 2 of pending U.S. patent application Ser. No. 09/778,524 | 3M Company, St. Paul, MN |

Examples F1–F8 are three layer flame retardant foam articles having a pressure sensitive adhesive layer on both outer surfaces of a fire retardant containing polymer foam core were prepared. These articles comprised a blend of an intumescent fire retardant based on ammonium polyphosphate and a small amount of a brominated phosphate fire retardant. Examples F1–F8 were constructed as set forth below.

Preparation of Packaged Pressure Sensitive Adhesive A

A pressure-sensitive adhesive composition was prepared by mixing 90 parts of 2-ethylhexyl acrylate (2-EHA), 10 parts of acrylic acid (AA), 0.15 parts IRGACURE 651 monomer, and 0.03 parts isooctyl thioglycolate (IOTG). The composition was placed into packages measuring approximately 100 mm by 50 mm by 5 mm thick as described in U.S. Pat. No. 5,804,610 (Hamer et al). The packaging film was 0.0635 mm (0.0025 inches) thick VA-24 film (a heat sealable, ethylene vinyl acetate copolymer film having 6% vinyl acetate, available from CT Film of Dallas, Tex.). The packages were immersed in a water bath and at the same time exposed to ultraviolet radiation at an intensity of 3.5 milliwatts per square centimeter and a total energy of 1627 millijoules per square centimeter as measured by NIST units to form a Packaged Pressure Sensitive Adhesive A.

Preparation of Pre-compounded Adhesive A

A skin adhesive was pre-compounded from Packaged Pressure Sensitive Adhesive A as follows:

The Packaged Pressure Sensitive Adhesive A was fed to the second feed port of the twin screw extruder through a first 51 mm single screw extruder (Bonnot). The Bonnot zone temperatures were set at the following: Zone 1=149° C. (300° F.), Zone 2=163° C. (325° F.), and Zone 3=177° C. (350° F.). The pump and heated hose were 177° C. (350° F.). A 30 mm co-rotating twin screw extruder (Werner Pfleider) operating at a screw speed of 300 rpm was used. The temperature for the six zones in the twin screw extruder was set at Zone 1=163° C. (325° F.), and Zones 2 through 6=121° C. (350° F.). The adhesive was delivered into a silicone coated paper box though a heated hose set at 121° C. (350° F.). The skin adhesive was identified as "Precompounded Adhesive A."

Preparation of Fire Retardant Three Layer Tape

Fire retardants were added as dry solids to the first feed port of a 30 mm co-rotating twin screw extruder with three additive ports (Werner Pfleider) operating at a screw speed of 300 rpm with a total flow rate of flame retardant and packaged pressure sensitive adhesive, as prepared above, of about 6.36 kilograms/hour (14 pounds/hour). The temperature for the six zones in the twin screw extruder was set at zone 1=38° C. (100° F.), zone 2=99° C. (210° F.), zone 3=104.5° C. (220° F.), zone 4=110° C. (230° F.), zone 5=115.5° C. (240° F.), and zone 6=121° C. (250° F.). The temperature in the extruder adapter was 149° C. (300° F.) and the flexible hose at the exit end of the extruder were all set at 182° C. (360° F.) The flow rate was controlled with a Zenith gear pump.

100 parts by weight of the "Packaged Pressure Sensitive Adhesive A" were fed to the second feed port of the twin screw extruder through a first 51 mm single screw extruder (Bonnot). The temperature for all zones was set at 176° C. (350° F.). F100D microspheres at a concentration of 1.5 parts by weight per 100 parts by weight of packaged adhesive were added downstream to the third feed port (about three-fourths of the way down the extruder barrel). The extrudate was pumped via the heated hose to the center/middle layer of an about 203.2 mm (8 inches) wide CLOEREN multilayer feedblock and die (available from The Cloeren Company, Orange, Tex.) with a gap of about 1 mm (0.040 inches).

Simultaneously, Pre-compounded Adhesive A was fed to the each of the outer layers of the three layer drop die from a second 51 mm single screw extruder (Bonnot) and coextruded with the extrudate above. The Bonnot zone temperatures were all set at 149° C. (300° F.). The pump and heated hose were set at 163° C. (325° F.). The thickness of one adhesive layer (Side 1) was about 0.084 mm (0.0033 inches) and the thickness of the other adhesive layer (Side 2) was about 0.086 mm (0.0034 inches).

The resulting three layer sheet had a thickness of about 0.99 mm (0.039 inches). The extruded sheet was cast onto a chill roll that was set at 7.2° C. (45.5° F.), cooled to about 25° C., and then transferred onto a 0.127 mm thick polyethylene (PET) release liner prepared according to Examples 10a and 10b of copending U.S. patent application Ser. No. 09/775955 "Adhesive Article and Method of Preparing." The release liner was applied to the adhesive layer of Side 1. The resulting article was wound into a roll for subsequent crosslinking.

Two approximately one meter (39 inches) long pieces were cut from the above sample roll. A 0.051 mm (0.002 inch) thick two sided, silicone-coated polyester liner, having different release materials (identified as 5035 and 7200) on each side, available from DCP-LOHJA Inc. Willowbrook, Ill. as 2-2PESTR(P2)-5035 & 7200, was carefully laminated to the uncovered adhesive layer on Side 2 of each piece so that the 7200 silicone coated side contacting the adhesive layer. The extruded sheet piece with liners on both sides was then passed through the electron beam (e-beam) processing unit (ESI Electro Curtain) operating at an accelerating voltage of 300 keV and at a speed of 6.1 meters per minute, once on each side. One piece received a measured e-beam dose of 6 megaRads on each side and the other piece received a measured e-beam dose of 8 megaRads on each side.

The measured e-beam dose was 6 megaRads on both sides. The feed rate of the pre-compounded pressure sensitive adhesive was 6.36 kg/hour (14 lbs/hr). The feed rate of the fire retardant was adjusted based on this rate to provide the desired amount of fire retardant in the polymer foam material. For example, for the fire retardant loading of 50% by weight, the feed rate of the fire retardant was 6.36 kg/hour or 14 lbs/hr.

Thickness of the resultant article was determined as follows: 203 mm wide (8 inch) strips were cut from the cross direction of the article and the thickness of each pressure sensitive adhesive layer and the overall thickness of the strip was measured with a microscope at three distances along the 203 mm (8 inch) direction: at approximately 25.4 mm (1 inch) (D1), at approximately 101 mm (4 inches) (D2), and at approximately 178 mm (7 inches) (D3). Thickness was measured in "mils" and converted to millimeters (mm) and are reported in Table 1.

Examples T1–T8 were prepared by laminating FTF to the three layer flame retardant foam articles of F1–F8 to provide flame retardant fluid transport tape assemblies. Examples T1–T8 were all laminated by hand by laminating the FTF to the PET liner side (Side 1) of the three layer foam adhesive composite. Once laminated and prior to testing for burn, the assemblies were allowed to dwell at ambient temperature for 24 hours. Examples T1–T8 were tested for burn following F.A.R. § 25.853, 12 second burn. and 60 second burn.

The flame retardant used, the amount of flame retardant, and the flammability results are given in Table 2 and Table 3. The numerical values reported are the average of two replicates with the exception of sample T8 on the 12 second testing and samples T5 and T6 on the 60 second testing in which only one replicate was tested.

TABLE 1

| Sample No. | Adhesive Layer Thickness, Side 1, mm (mils) | | | Adhesive Layer Thickness, Side 2, mm (mils) | | | Article Thickness, mm (mils) | | |
|---|---|---|---|---|---|---|---|---|---|
| | D1 | D2 | D3 | D1 | D2 | D3 | D1 | D2 | D3 |
| F1 | 0.057 (2.25) | 0.096 (3.80) | 0.074 (2.90) | 0.057 (2.25) | 0.046 (1.80) | 0.057 (2.25) | 0.93 (36.65) | 1.04 (40.95) | 1.01 (39.70) |
| F2 | 0.116 (4.55) | 0.086 (3.40) | 0.067 (2.65) | 0.067 (2.65) | 0.052 (2.05) | 0.080 (3.15) | 1.48 (58.40) | 1.55 (61.20) | 1.33 (52.45) |
| F3 | 0.081 (3.20) | 0.052 (2.05) | 0.060 (2.35) | 0.072 (2.85) | 0.039 (1.55) | 0.071 (2.80) | 1.02 (40.25) | 1.14 (45.05) | 1.13 (44.65) |
| F4 | 0.084 (3.30) | 0.077 (3.05) | 0.071 (2.80) | 0.090 (3.55) | 0.063 (2.50) | 0.072 (2.85) | 1.03 (40.50) | 1.08 (42.35) | 0.91 (36.05) |
| F5 | 0.067 (2.65) | 0.076 (3.00) | 0.088 (3.45) | 0.074 (2.90) | 0.042 (1.65) | 0.072 (2.85) | 1.01 (39.65) | 1.07 (42.00) | 1.06 (41.90) |
| F6 | 0.043 (1.70) | 0.063 (2.50) | 0.082 (3.25) | 0.063 (2.50) | 0.033 (1.30) | 0.066 (2.60) | 0.98 (38.75) | 1.13 (44.65) | 1.01 (39.80) |
| F7 | 0.077 (3.05) | 0.066 (2.60) | 0.072 (2.85) | 0.063 (2.50) | 0.029 (1.15) | 0.067 (2.65) | 1.08 (42.50) | 1.13 (44.40) | 0.91 (36.20) |
| F8 | 0.082 (3.25) | 0.061 (2.40) | 0.081 (3.20) | 0.037 (1.45) | 0.029 (1.15) | 0.074 (2.90) | 1.04 (40.90) | 1.17 (45.95) | 0.96 (37.85) |

TABLE 2

| | | Amount of Flame Retardant | 12 Second Vertical Burn Results | | | | |
|---|---|---|---|---|---|---|---|
| Sample No. | Flame Retardant | (% of wt. polymer foam material) | Drippings (two replicates) | Dripping Burn Time, seconds | Flame Time, seconds | Burn Length, mm (inches) | Overall, Pass/Fail |
| T1 | FR 370 | 35 | No/no | 0 | 0 | 11.18 (0.44) | Pass |
| T2 | FR 370 | 30 | yes/no | 0.5 | 0 | 16.00 (0.63) | Pass |
| T3 | FR 370 | 29.55 | no/yes | 0.5 | 0.66 | 14.22 (0.56) | Pass |
| | FLAMESTAB NOR 116 | 1.42 | | | | | |
| T4 | EXOLIT IFR 23 | 42 | No/no | 0 | 0 | 4.83 (0.19) | Pass |
| | FR 370 | 8 | | | | | |
| T5 | EXOLIT IFR 23 | 50 | No/no | 0 | 0 | 4.83 (0.19) | Pass |
| T6 | EXOLIT IFR 23 | 49.49 | No/no | 0 | 0 | 4.83 (0.19) | Pass |
| | FLAMESTAB NOR 116 | 1.01 | | | | | |

TABLE 2-continued

| Sample No. | Flame Retardant | Amount of Flame Retardant (% of wt. polymer foam material) | Drippings (two replicates) | 12 Second Vertical Burn Results | | | Overall, Pass/Fail |
|---|---|---|---|---|---|---|---|
| | | | | Dripping Burn Time, seconds | Flame Time, seconds | Burn Length, mm (inches) | |
| T7 | EXOLIT IFR 23 | 39.65 | no/yes | 5 | >15 | 38.1 (1.50) | Fail |
| | FLAMESTAB NOR 116 | 1.23 | | | | | |
| T8 | EXOLIT IFR 23 | 29.55 | Yes/yes | 2 | >42 | >76.2 (>3.0) | Fail |
| | FLAMESTAB NOR 116 | 1.42 | | | | | |

TABLE 3

| Sample No. | Flame Retardant | Amount of Flame Retardant (% of wt. polymer foam material) | Drippings (two replicates) | 60 Second Vertical Burn Results | | | Overall, Pass/Fail |
|---|---|---|---|---|---|---|---|
| | | | | Dripping Burn Time, seconds | Flame Time, seconds | Burn Length, mm (inches) | |
| T1 | FR 370 | 35 | Yes/yes | 0 | 0 | 87.38 (3.44) | Pass |
| T2 | FR 370 | 30 | Yes/yes | 0 | 0 | 44.45 (1.75) | Pass |
| T3 | FR 370 | 29.55 | Yes/yes | 0 | 0 | 42.93 (1.69) | Pass |
| | FLAMESTAB NOR 116 | 1.42 | | | | | |
| T4 | EXOLIT IFR 23 | 42 | Yes/yes | 1.25 | 0.7 | 28.70 (1.13) | Pass |
| | FR 370 | 8 | | | | | |
| T5 | EXOLIT IFR 23 | 50 | Yes/yes | >5 | >60 | 73.15 (2.88) | Fail |
| T6 | EXOLIT IFR 23 | 49.49 | Yes/yes | >5 | >0 | 117.60 (4.63) | Fail |
| | FLAMESTAB NOR 116 | 1.01 | | | | | |

The results in Tables 2 and 3 indicate that flame retardant fluid transport tape assemblies with a flame retardant foam construction comprising IFR 23 and FR 370 flame retardants at appropriate levels, pass the 12 second and 60 second vertical burn tests. Additionally the fire retardant synergist NOR 116 can enhance the performance of the flame retardants.

Samples T1 through T4 were tested for 90 Degree Peel Strength according to ASTM Test Method D-3330.

The test coupons were prepared as follows: 12.5 mm (0.5 inch) wide samples of T1–T4 were cut. The articles were placed with the adhesive layer down on a clean substrate and rolled with a 6.8 kg. (15 lb) roller. Substrates evaluated included stainless steel and Gillfab composite flooring, 9017T, from M. C. Gill Corporation, El Monte, Calif. The laminate formed was allowed to dwell at room temperature (approx. 22° C.) for 72 hours. The samples were tested for 90 Degree Peel Strength at a crosshead speed of 30 cm (12 inches) per minute using an IMASS tester. Peel strength was recorded in ounces/0.5 inches (oz/0.5 in) and converted to Newtons/millimeter (N/mm) and represents the average of all values measured from the start to the end of the peel area. The Peel Strength reported is the average of two replicates. Results are given in Table 4.

TABLE 4

| | Avg. Peel Strength, N/mm (oz/0.5 in) | |
|---|---|---|
| Sample No. | Stainless Steel | Composite Flooring |
| T1 | 1.61 (73.55) | 0.99 (45.20) |
| T2 | 2.85 (128.95) | 2.04 (93.25) |
| T3 | 1.65 (75.15) | 1.66 (75.90) |
| T4 | 1.55 (70.75) | 0.56 (25.40) |

Examples T1 through T4 were tested for 2 Bond Strength Testing according to the following procedure.

The test coupons were prepared as follows: 12.5 mm (0.5 inch) wide samples of T1–T4 were cut. The examples were placed with the adhesive layer down on a clean substrate and rolled with a 6.8 kg. (15 lb) roller. The substrate the samples were applied to was an anodized aluminum panel. To begin the peel the FTF was peeled slightly off the foam tape and then inserted in the grip of the IMASS tester. The 2 Bond Strength was measured by testing the 90 Degree Peel Strength at a crosshead speed of 30 cm (12 inches) per minute using an IMASS tester. 2 Bond Peel Strength was recorded in ounces/0.5 inches (oz/0.5 in) and converted to Newtons/millimeter (N/mm) and represents the average of all values measured from the start to the end of the peel area. The 2 Bond Peel Strength reported is the average of two replicates. Results are given in Table 5.

TABLE 5

| Sample No. | Avg. 2 Bond Strength, N/mm (oz/0.5 in) |
|---|---|
| T1 | 2.21 (100.75) |
| T2 | 2.37 (108.40) |
| T3 | 1.60 (73.05) |
| T4 | 1.55 (70.70) |

Samples T1 through T4 were tested for Vertical Wicking Performance according to the following method described. The testing was performed by cutting each sample to ½ inch by approximately 7 inches in the machine direction. The samples were hung vertically from a wicking stand with wicking fluid directly below. The wicking fluid used was prepared by adding 5 drops of food coloring to 15 mL of water, to facilitate the reading of wicking distance. The samples were lowered so that 1.5 mm of the bottom edge was submerged in the fluid. Using a stopwatch to keep time, the samples were left in the wicking fluid for 60 seconds. The samples were immediately removed from the fluid and the wicking stand and placed horizontally on a white piece of paper. The distance the fluid transported vertically up the sample was measured and documented in centimeters (cm). The Vertical Wicking Distance reported is the average of two replicates. The results are shown in Table 6.

TABLE 6

| Sample No. | Vertical Wicking Distance, cm traveled in 60 sec |
|---|---|
| T1 | 7.05 |
| T2 | 7.15 |
| T3 | 8.50 |
| T4 | 7.50 |

It is understood that the features of these various embodiments may be compiled in any desired combination, configuration or assembly, depending upon the application involved. As such, various modifications and alterations of this invention will become apparent to those skilled in the art without departing from the scope and spirit of the invention.

What is claimed is:

1. An assembly comprising:
   A fluid control layer having a top side and a bottom side, the top side constructed to facilitate the evaporation or the flow of a fluid disposed thereon;
   A fire retardant material having a first major surface and a second major surface, the first major surface of the fire retardant material attached to the bottom side of the fluid control layer, the fire retardant material comprising a polymer and an antimony-free fire retardant; and
   An adhesive layer associated with the second major surface of the fire retardant material.

2. The assembly of claim 1, further comprising a cap layer having a top side and a bottom side, the bottom side of the cap layer associated with the top side of the fluid control layer to define a channel structure therebetween.

3. The assembly of claim 2 wherein the cap layer, or the fluid control layer, or both the cap layer and the fluid control layer further comprise a fire retardant.

4. The assembly of claim 2 wherein the bottom side of the cap layer is affixed to the top side of the fluid control layer by an adhesive.

5. The assembly of claim 2 wherein the cap layer is porous.

6. The assembly of claim 2 wherein the cap layer comprises a floor covering.

7. The assembly of claim 1, wherein the top side of the fluid control layer comprises generally parallel ridges defining a plurality of channels to facilitate the flow of a fluid disposed thereon, each channel having a first channel end and a second channel end.

8. The assembly of claim 7 wherein the top side of the fluid control layer further comprises a microstructure-bearing surface within the plurality of channels.

9. The assembly of claim 8, further comprising:
   a cap layer having a top side and a bottom side, the bottom side of the cap layer being placed over the top side of the fluid control layer; and
   means for moving fluid through the channels along the top side of the fluid control layer between the first channel end and the second channel end.

10. The assembly of claim 9 wherein the means for moving fluid creates a potential between the first channel end and the second channel end.

11. The assembly of claim 10 wherein the potential is sufficient to move fluid within the channel toward either the first channel end or the second channel end for withdrawal of the fluid from the top side of the fluid control layer.

12. The assembly of claim 11 wherein the means for moving fluid comprises gravity, an applied vacuum, air impingement, magnetic means, electrostatic means and combinations of the foregoing.

13. The assembly of claim 9 wherein the top side of the fluid control layer has a cross-channel therein, the cross-channel constructed to allow fluid flow between the channels, the fluid control layer further comprising a fluid removal aperture therethrough, the aperture allowing fluid communication between the cross-channel and the means for moving fluid.

14. The assembly of claim 1 wherein the polymer of the fire retardant material is an expanded foam material, the first major surface being associated with the bottom side of the fluid control layer with a first adhesive, a primer, an adhesion promoter, or a combination of the foregoing.

15. The assembly of claim 14 wherein the first adhesive comprises a material selected from the group consisting of a copolymer of ethylhexyl acrylate and acrylic acid, a copolymer of isooctyl acrylate and acrylic acid, and a blend of an acrylic adhesive and rubber based adhesive.

16. The assembly of claim 15 wherein the first adhesive further comprises a fire retardant.

17. The assembly of claim 15 wherein the first adhesive comprises no added fire retardant.

18. The assembly of claim 15 wherein the adhesive layer associated with the second surface of the foam material comprises a second adhesive material selected from the group consisting of a copolymer of ethylhexyl acrylate and acrylic acid, a copolymer of isooctyl acrylate and acrylic acid, and a blend of an acrylic adhesive and rubber based adhesive.

19. The assembly of claim 18 wherein the second adhesive further comprises a fire retardant.

20. The assembly of claim 18 wherein the second adhesive comprises no added fire retardant.

21. The assembly of claim 18 wherein the first adhesive and the second adhesive further comprise microfibers imparting stretch release properties to the assembly, the microfibers comprising material selected from the group consisting of polymeric microfibers, viscoelastic microfibers, elastic microfibers, and combinations of the foregoing.

22. The assembly of claim 18 wherein the expanded foam material comprises a material selected from the group consisting of elastomers, rubbers, thermoplastic elastomers, rubber based and acrylic adhesives, polyolefin polymers, acrylate polymers and methacrylate polymers, acrylate and methacrylate copolymers, and combinations thereof.

23. The assembly of claim 22 wherein the expanded foam material further comprises microfibers imparting stretch release properties to the article, the microfibers comprising material selected from the group consisting of polymeric microfibers, viscoelastic microfibers, elastic microfibers, and combinations of the foregoing.

24. The assembly of claim 1 wherein the polymer of the fire retardant material is an expanded polymeric foam material.

25. The assembly of claim 24 wherein the antimony-free fire retardant is an intumescent material comprising an acid source, a char former, and a blowing agent.

26. The assembly of claim 25, the expanded foam material further comprising one or more synergists selected from the group consisting of tris(tribromoncopentyl)phosphate, melamine phosphate, melamine polyphosphate, and boroxo siloxane elastomer.

27. The assembly of claim 26 wherein the antimony-free fire retardant is present in the expanded polymeric foam material at a concentration of between about 20 wt. % and about 60 wt. %.

28. The assembly of claim 1 wherein the fire retardant material comprises a multilayer laminate sheet comprising a high-temperature-stable polymer and non-metallic fibers.

29. The assembly of claim 28 wherein the high temperature-stable polymer is a material selected from the group consisting of polyamide, polyvinyl fluoride, silicone resin, polyimide, polytetrafluoroethylene, polyester, polyaryl sulfone, polyetheretherketone, polyester amide, polyester imide, polyethersulfone, polyphenylene sulfide and combinations thereof.

30. The assembly of claim 28 wherein the non-metallic fibers comprise a material selected from the group consisting of glass, aramid fiber, crystalline ceramic oxide, silicon nitride, silicon carbide, oxidized polyacrylonitrile, carbon and combinations thereof.

31. The assembly of claim 1 wherein the fire retardant material comprises a cleanly removable multilayer tape.

32. The assembly of claim 31 wherein tile cleanly removable multilayer tape comprises a core layer, the adhesive layer comprising a first adhesive layer adhered to at least a portion of the first major surface, and a second adhesive layer adhered to at least a portion of the second major surface.

33. The assembly of claim 32 wherein first adhesive layer and the second adhesive layer each comprise a pressure sensitive adhesive.

34. The assembly of claim 33 wherein the first and second adhesives comprise a materials selected from the group consisting of acrylic polymer, polyurethane, thermoplastic elastomer, block copolymer, polyolefin, silicone, rubber based adhesive, and combinations of the foregoing.

35. The assembly of claim 32 further comprising fibrous reinforcing material dispersed within the core layer, the fibrous reinforcing material imparting stretch release properties to the tape.

36. The assembly of claim 32 wherein the core layer comprises a polymer film and wherein any of the first adhesive layer, the second adhesive layer, and the core layer further comprise a fire retardant selected from the group consisting of antimony free fire retardant, polybrominated biphenyl free fire retardant, intumescent fire retardant, and combinations thereof.

37. A fluid management system comprising a layer of insulating material associated with the assembly of claim 1.

38. A fluid management system for aircraft having an outer fuselage surface forming the exterior surface of the aircraft, an inner fuselage surface forming the outermost interior surface of the aircraft, the system comprising:
the assembly of claim 1 associated with the inner fuselage surface.

39. A fluid management system for aircraft having an outer fuselage surface forming the exterior surface of the aircraft, an inner fuselage surface forming the outermost interior surface of the aircraft, and an inner compartment housed within the inner surface, the inner compartment having a compartment outer surface adjacent to the inner fuselage surface, the compartment outer surface comprising the assembly of claim 1.

40. The system of claim 39 further comprising a layer of insulation between the compartment outer surface and the assembly of claim 1.

41. The system of claim 39 wherein the fire retardant material of the assembly of claim 1 comprises an insulating material associated with the compartment outer surface.

42. A method for the management of fluid within an aircraft having an outer fuselage surface forming the exterior surface of the aircraft, an inner fuselage surface forming the outermost interior surface of the aircraft, and an inner compartment housed within the inner surface, the inner compartment having a compartment outer surface adjacent to the inner fuselage surface, the method comprising:
placing an assembly according to claim 1 between the compartment outer surface and the inner fuselage surface to facilitate the evaporation or the flow of fluid.

43. The method of claim 42 wherein placing an assembly comprises affixing the assembly to the inner fuselage surface.

44. The method of claim 42 wherein placing an assembly comprises associating the assembly with the compartment outer surface.

45. The method of claim 44 wherein the compartment outer surface comprises a layer of insulation and wherein placing an assembly comprises associating the assembly with the layer of insulation.

46. The method of claim 42 wherein the fire retardant material comprises a multilayer laminate sheet comprising a high-temperature-stable polymer and non-metallic fibers.

47. The method of claim 46 wherein the high temperature-stable polymer is a material selected from the group consisting of polyamide, polyvinyl fluoride, silicone resin, polyimide, polytetrafluoroethylene, polyester, polyaryl sulfone, polyetheretherketone, polyester amid, polyester imide, polyethersulfone, polyphenylene sulfide and combinations thereof.

48. The method of claim 46 wherein the non-metallic fibers comprise a material selected from the group consisting of glass, aramid fiber, crystalline ceramic oxide, silicon nitride, silicon carbide, oxidized polyacrylonitrile, carbon and combinations thereof.

49. The method of claim 42 wherein the fire retardant material comprises a cleanly removable multilayer tape.

50. The method of claim 49 wherein the cleanly removable multilayer tape comprises a core layer, the adhesive layer comprising a first adhesive layer adhered to at least a portion of the first major surface, and a second adhesive layer adhered to at least a portion of the second major surface.

51. The method of claim 50 wherein first adhesive layer and the second adhesive layer each comprise a pressure sensitive adhesive.

52. The method of claim 51 wherein the first and second adhesives comprise a materials selected from the group consisting of acrylic polymer, polyurethane, thermoplastic elastomer, block copolymer, polyolefin, silicone, rubber based adhesive, and combinations of the foregoing.

53. The method of claim 50 further comprising fibrous reinforcing material dispersed within the core layer, the fibrous reinforcing material imparting stretch release properties to the tape.

54. The method of claim 50 wherein the core layer comprises a polymer film and wherein any of the first adhesive layer, the second adhesive layer, and the core layer further comprise a fire retardant selected from the group consisting of antimony free fire retardant, polybrominated biphenyl free fire retardant, intumescent fire retardant and combinations thereof.

55. An assembly comprising:

A fluid control layer having a top side and a bottom side, the top side constructed to facilitate the evaporation or the flow of a fluid disposed thereon;

A fire retardant material integral with the fluid control layer, the fire retardant material comprising a polymer and an antimony-free fire retardant.

56. A panel suitable for use in the construction of the inner compartment of an aircraft, the panel comprising:

A body member adapted to abut against another similarly constructed panel;

A layer of insulating material associated with the body member; and

The assembly of claim 55 associated with the insulating material.

57. A panel suitable for use in the construction of the inner compartment of an aircraft, the panel comprising:

A body member having an edge adapted to abut against another similarly constructed panel; and The assembly of claim 1 disposed along the body member.

58. The panel of claim 57 wherein the assembly is disposed along the edge so that at least part of the assembly extends beyond the edge and is adapted to engage another structure positioned adjacent to the edge of the body member.

* * * * *

UNITED STATES PATENT AND TRADEMARK OFFICE
CERTIFICATE OF CORRECTION

PATENT NO. : 6,803,090 B2
DATED : October 12, 2004
INVENTOR(S) : Castiglione, Stephanie B.

It is certified that error appears in the above-identified patent and that said Letters Patent is hereby corrected as shown below:

Title page,
Item [56], References Cited, FOREIGN PATENT DOCUMENTS, delete "WO/32663" and insert -- WO 02/32663 -- therefore;

Column 9,
Line 36, after the word "peaks" insert -- . --;

Column 11,
Line 48, delete "compatable" and insert -- compatible -- therefore;

Column 15,
Line 36, delete "tranport" and insert -- transport -- therefore;
Line 53, delete "vaccum" and insert -- vacuum -- therefore;
Line 53, delete "positoned" and insert -- positioned -- therefore;

Column 29,
Line 47, after "were" insert -- set at --;
Line 54, delete "Precompounded" and insert -- Pre-compounded -- therefore;

Column 30,
Line 17, after "(360°F)" insert -- . --;

Column 37,
Line 21, delete "(tribromoncopentyl)" and insert -- (tribromoneopentyl) -- therefore;
Line 45, delete "tile" and insert -- the -- therefore;

UNITED STATES PATENT AND TRADEMARK OFFICE
CERTIFICATE OF CORRECTION

PATENT NO. : 6,803,090 B2
DATED : October 12, 2004
INVENTOR(S) : Castiglione, Stephanie B.

It is certified that error appears in the above-identified patent and that said Letters Patent is hereby corrected as shown below:

<u>Column 38,</u>
Line 52, delete "amid" and insert -- amide -- therefore;

Signed and Sealed this

Fifth Day of July, 2005

JON W. DUDAS
*Director of the United States Patent and Trademark Office*